United States Patent
Benner, Jr.

(10) Patent No.: US 9,270,144 B2
(45) Date of Patent: Feb. 23, 2016

(54) HIGH TORQUE LOW INDUCTANCE ROTARY ACTUATOR

(71) Applicant: William R. Benner, Jr., Longwood, FL (US)

(72) Inventor: William R. Benner, Jr., Longwood, FL (US)

( * ) Notice: Subject to any disclaimer, the term of this patent is extended or adjusted under 35 U.S.C. 154(b) by 543 days.

(21) Appl. No.: 13/738,801

(22) Filed: Jan. 10, 2013

(65) Prior Publication Data

US 2013/0181549 A1   Jul. 18, 2013

Related U.S. Application Data

(63) Continuation-in-part of application No. 13/446,437, filed on Apr. 13, 2012, now Pat. No. 8,963,396.

(60) Provisional application No. 61/585,721, filed on Jan. 12, 2012, provisional application No. 61/539,172, filed on Sep. 26, 2011.

(51) Int. Cl.
| | |
|---|---|
| H02K 1/17 | (2006.01) |
| H02K 33/16 | (2006.01) |
| H02K 21/04 | (2006.01) |
| H02K 1/14 | (2006.01) |

(52) U.S. Cl.
CPC .............. *H02K 1/17* (2013.01); *H02K 21/046* (2013.01); *H02K 33/16* (2013.01); *H02K 1/146* (2013.01); *H02K 1/148* (2013.01); *H02K 2201/03* (2013.01)

(58) Field of Classification Search
CPC ....... H02K 1/148; H02K 1/17; H02K 21/046; H02K 2201/03; H02K 33/16; H02K 15/00; H02K 1/14; H02K 1/146; H02K 1/27; H02K 21/04; H02K 21/14; H02K 21/16; H02K 29/03

USPC .................... 310/216.022, 38, 181
See application file for complete search history.

(56) References Cited

U.S. PATENT DOCUMENTS

| | | | |
|---|---|---|---|
| 496,449 A | 3/1893 | Wanner et al. | |
| 518,561 A | 4/1894 | Brown | |
| 589,543 A | 9/1897 | Brown | |
| 742,345 A | 10/1903 | Mygatt | |

(Continued)

FOREIGN PATENT DOCUMENTS

| | | |
|---|---|---|
| GB | 742345 | 12/1955 |
| JP | 2003158834 A | 5/2003 |

(Continued)

OTHER PUBLICATIONS

Office Action of Aug. 7, 2014 for U.S. Appl. No. 13/446,500.

*Primary Examiner* — Alex W Mok
(74) *Attorney, Agent, or Firm* — Carl M. Napolitano; Gray Robinson, P.A.

(57) ABSTRACT

An electromechanical rotary actuator includes a rotor and a stator having one or more slots into which one or more coils are placed. The stator includes a rotor position restoring means which overcomes cogging outside a desired rotation range. The rotor position restoration means may include one or more restoring magnets or optionally include a contoured cavity within the stator proximate the rotor. One stator includes teeth having contoured ends forming a portion of the aperture within which the rotor operates. Distal ends of the teeth form a relatively large gap compared to typical actuators, wherein the gap is sized to the rotor magnet. An actuator desirably having a high torque constant, low coil resistance and a low coil inductance is provided.

21 Claims, 32 Drawing Sheets

(56) References Cited

U.S. PATENT DOCUMENTS

| | | | |
|---|---|---|---|
| 2,064,090 A | 12/1936 | Sullivan et al. |
| 2,251,673 A | 8/1941 | Gillen |
| 2,464,320 A | 3/1949 | Klinkhamer |
| 2,530,533 A | 11/1950 | Moody |
| 3,109,601 A | 11/1963 | Der Hoek et al. |
| 3,434,082 A | 3/1969 | Montagu |
| 3,979,616 A | 9/1976 | Stechmann |
| 3,984,714 A | 10/1976 | Grozinger et al. |
| 4,076,998 A | 2/1978 | Montagu |
| 4,095,130 A | 6/1978 | Oshima et al. |
| 4,275,371 A | 6/1981 | Vogel |
| 4,302,720 A | 11/1981 | Brill |
| 4,319,823 A | 3/1982 | Hashimoto |
| 4,369,385 A | 1/1983 | Malkin et al. |
| 4,408,726 A | 10/1983 | Leonov et al. |
| 4,491,815 A | 1/1985 | Idogaki et al. |
| 4,506,182 A | 3/1985 | Rohdin |
| 4,510,403 A | 4/1985 | Vanderlaan et al. |
| 4,528,533 A | 7/1985 | Montagu |
| 4,533,891 A | 8/1985 | Vanderlaan et al. |
| 4,571,516 A | 2/1986 | Schneiter |
| 4,763,034 A * | 8/1988 | Gamble ................ H02K 37/20 310/181 |
| 4,795,929 A | 1/1989 | Elgass et al. |
| 4,804,934 A | 2/1989 | Finke et al. |
| 4,817,076 A | 3/1989 | Van et al. |
| 4,904,926 A | 2/1990 | Pasichinskyj |
| 4,926,079 A | 5/1990 | Niemela et al. |
| 5,029,379 A | 7/1991 | Niemela et al. |
| 5,225,770 A | 7/1993 | Montagu |
| 5,237,165 A | 8/1993 | Tingley, III |
| 5,275,141 A | 1/1994 | Tsunoda et al. |
| 5,337,030 A | 8/1994 | Mohler |
| 5,369,322 A | 11/1994 | Maruyama et al. |
| 5,424,632 A | 6/1995 | Montagu |
| 5,465,019 A | 11/1995 | Kliman |
| 5,583,387 A | 12/1996 | Takeuchi et al. |
| 5,708,406 A | 1/1998 | Tsunoda et al. |
| 5,729,071 A | 3/1998 | Steiner |
| 5,786,651 A | 7/1998 | Suzuki |
| 5,831,363 A | 11/1998 | Fukita et al. |
| 5,870,010 A | 2/1999 | Ackermann |
| 5,927,249 A | 7/1999 | Ackermann et al. |
| 6,034,461 A | 3/2000 | Sun |
| 6,079,833 A | 6/2000 | Kaelin et al. |
| 6,127,753 A | 10/2000 | Yamazaki et al. |
| 6,153,952 A | 11/2000 | Ito et al. |
| 6,243,188 B1 | 6/2001 | Stukalin et al. |
| 6,275,319 B1 | 8/2001 | Gadhok |
| 6,448,673 B1 | 9/2002 | Brown et al. |
| 6,507,257 B2 | 1/2003 | Mohler |
| 6,509,664 B2 * | 1/2003 | Shah .................... H02K 21/042 310/156.19 |
| 6,665,102 B2 | 12/2003 | Maruyama et al. |
| 6,844,653 B2 | 1/2005 | Kolomeitsev et al. |
| 6,880,229 B2 | 4/2005 | Zepp et al. |
| 6,960,848 B2 | 11/2005 | Naganuma et al. |
| 6,984,911 B2 | 1/2006 | Horie et al. |
| 7,042,130 B2 | 5/2006 | Zepp et al. |
| 7,071,800 B2 | 7/2006 | Nakanishi et al. |
| 7,122,920 B2 | 10/2006 | Mizumaki |
| 7,158,323 B2 | 1/2007 | Kim et al. |
| 7,262,535 B2 | 8/2007 | Pruyn |
| 7,414,347 B2 | 8/2008 | Wang et al. |
| 7,471,432 B2 | 12/2008 | Pruyn |
| 7,541,711 B2 | 6/2009 | Adaniya et al. |
| 7,554,240 B2 | 6/2009 | Lewis et al. |
| 7,687,948 B2 | 3/2010 | Sortore et al. |
| 7,777,372 B2 | 8/2010 | Tanimoto et al. |
| 7,839,041 B2 | 11/2010 | Mohler |
| D642,265 S | 7/2011 | Hastings |
| 8,212,448 B2 | 7/2012 | Sun et al. |
| 8,284,470 B2 | 10/2012 | Brown et al. |
| 8,482,243 B2 | 7/2013 | Langreck |
| 8,674,649 B2 | 3/2014 | Langreck |
| 2003/0178903 A1 | 9/2003 | Rapp |
| 2004/0051417 A1 | 3/2004 | Yamazaki et al. |
| 2004/0155549 A1 | 8/2004 | Marioni |
| 2004/0239200 A1 | 12/2004 | Strahan |
| 2005/0062353 A1 * | 3/2005 | Brown ................ H02K 1/2726 310/156.11 |
| 2005/0093381 A1 | 5/2005 | Ionel et al. |
| 2005/0264111 A1 | 12/2005 | Tanaka et al. |
| 2006/0290225 A1 | 12/2006 | Mipo et al. |
| 2007/0120436 A1 | 5/2007 | Kawasaki et al. |
| 2007/0164615 A1 | 7/2007 | Lewis et al. |
| 2007/0252461 A1 * | 11/2007 | Komori ............... B29C 45/1418 310/90 |
| 2008/0036310 A1 | 2/2008 | Marioni |
| 2008/0054737 A1 | 3/2008 | Inayama et al. |
| 2008/0088187 A1 | 4/2008 | Shao et al. |
| 2008/0185932 A1 * | 8/2008 | Jajtic ...................... H02K 1/148 310/181 |
| 2008/0252152 A1 * | 10/2008 | Gsinn .................... H02K 1/17 310/12.24 |
| 2009/0091198 A1 * | 4/2009 | Husband ............... H02K 21/44 310/46 |
| 2009/0230804 A1 | 9/2009 | Legros et al. |
| 2010/0270893 A1 | 10/2010 | Bruno et al. |
| 2011/0127872 A1 | 6/2011 | Podack |
| 2012/0043832 A1 | 2/2012 | Neff et al. |
| 2013/0076185 A1 | 3/2013 | Benner |
| 2013/0076194 A1 | 3/2013 | Benner |
| 2013/0181549 A1 | 7/2013 | Benner |
| 2013/0200742 A1 | 8/2013 | Seki et al. |

FOREIGN PATENT DOCUMENTS

| | | |
|---|---|---|
| JP | 4201317 B2 | 12/2008 |
| KR | 101102675 | 1/2012 |
| WO | 2009040272 A | 4/2009 |
| WO | 2009083898 A | 7/2009 |

* cited by examiner

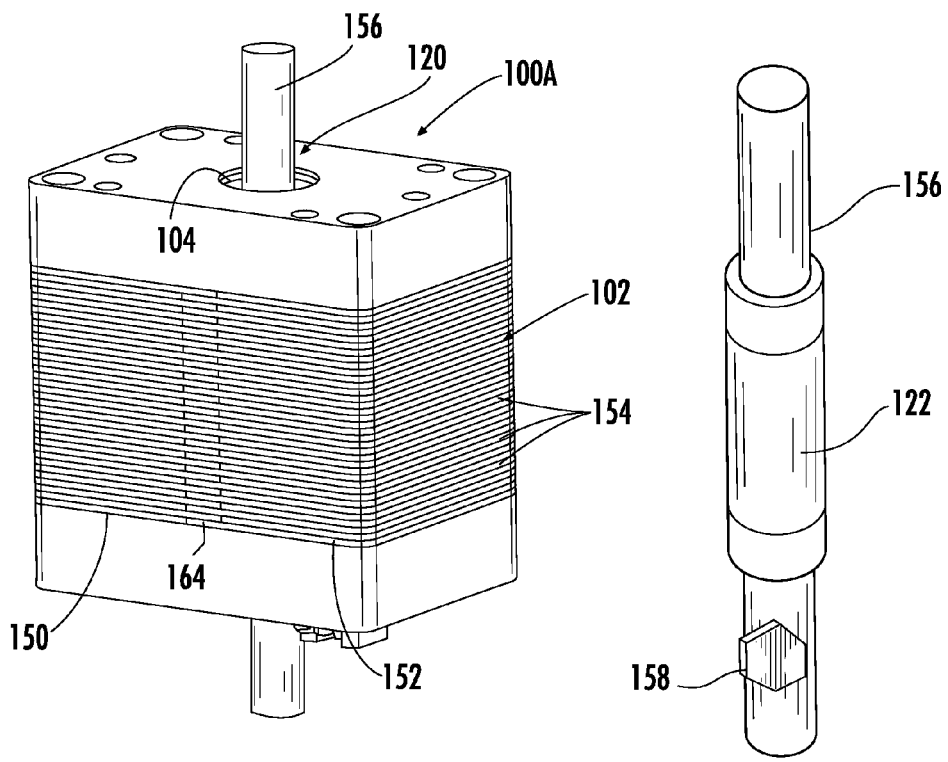
FIG. 9A
FIG. 9C
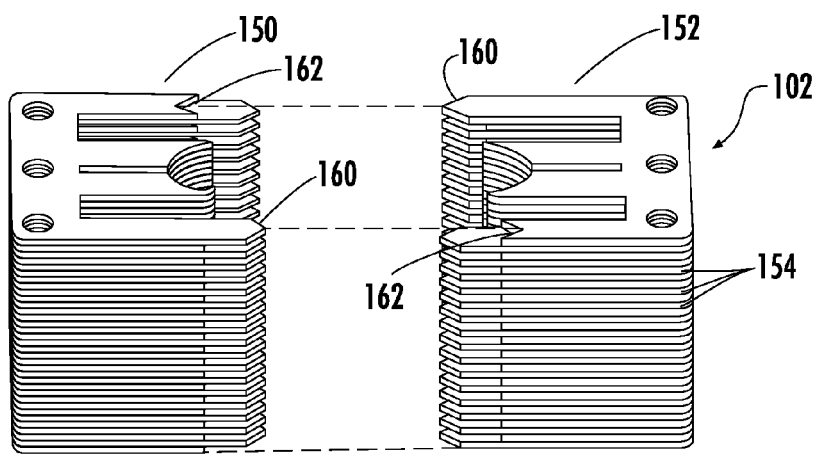
FIG. 9B

HIGH TORQUE LOW INDUCTANCE ROTARY ACTUATOR

CROSS REFERENCE TO RELATED APPLICATION

This application claims priority to Application Ser. No. 61/585,721, having filing date of Jan. 12, 2012 for High Torque Low Inductance Rotary Actuator Device and Associated Method, and is a continuation-in-part of application Ser. No. 13/446,437, having a filing date of Apr. 13, 2012 for Electromechanical Device and Assembly Method, which itself claims benefit of Application Ser. No. 61/539,172, having a filing date of Sep. 26, 2011, the disclosures of which are incorporated herein by reference, and commonly owned.

FIELD OF THE INVENTION

The present invention generally relates to limited angle electromechanical rotary actuators and in particular to actuators used in the field of optical scanning.

BACKGROUND OF THE INVENTION

Electromechanical rotary actuators have been in existence for decades. They are used in a variety of industrial and consumer applications, but they are particularly useful in the field of optical scanning, where an optical element is attached to an actuator output shaft, which is then rotated back and forth in an oscillating manner.

For example, it is common to attach a mirror to the output shaft of a rotary actuator in order to create an optical scanning system. In this application, the actuator/mirror combination can redirect a beam of light through a range of angles, or redirect the field of view of a camera so that it can observe a variety of targets.

Other optical elements can be attached to the output shaft as well. For example, a prism or an optical filter can be attached to the shaft and the rotation of the actuator shaft can vary the angle of the prism or filter. If a dielectric filter is used, changing the filter's angle-of-incidence will shift the bandpass wavelength characteristics higher or lower, thus allowing the optical system to be tuned to a particular wavelength. Alternatively, the prism or filter can be rotated completely into and out of the beam path, thus allowing selective filtering of the beam.

Typical electromechanical rotary actuators used in the field of optical scanning are generally made from some combination of magnet, steel and coils of insulated "magnet" wire. These elements have been arranged in a variety of ways, but for the past twenty years, the most popular arrangement has been to use a simple two-pole rotor magnet, and a "toothless" stator design.

The rotor within these actuators is typically a solid, cylindrical magnet made from high grade Neodymium Iron Boron which is diametral magnetized, and onto which two shafts are attached. One shaft portion may be attached to a mirror, and another shaft portion operable with a position sensor. The shaft is typically supported by ball bearings. By way of example, dimensions for this disclosure may comprise a rotor magnet having a diameter of 0.12 inches (around 3 millimeters) and a length of 1.3 inches (around 33 millimeters).

It will be helpful to review known actuator technology and make reference to known actuators to have the reader better understand the needs satisfied by embodiments of the present invention. While addressing problems in the art in this background section of the disclosure, it will also be helpful to describe developing embodiments generally accomplished through extensive analysis and experimentation. Therefore, all the disclosure included in this background section should not be construed as being a known prior art teaching.

FIG. 1 illustrates a sectional view of the rotor and stator arrangement found in a typical "toothless" optical scanner of the current state of the art. The stator is essentially tubular. For the rotor magnet diameter described above, a typical stator tube may have an outside diameter of 0.5 inches (around 12.7 millimeters), an inside diameter of 0.196 inches (around 5 millimeters), and is typically made from cold rolled steel. Coils of magnet wire are formed and bonded to the inside wall of the stator steel tube, occupying around a 90 degree arc. There is typically around a 0.007 inch gap between the outside wall of the rotor magnet and the inside wall of the coil, thus allowing the magnet to rotate freely. Within FIG. 1, the coil areas are designated "Coil plus" and "Coil minus" to indicate turns going into the page and turns coming out of the page, respectively.

FIG. 2 illustrates magnetic field lines found in a typical "toothless" optical scanner of the current state of the art as illustrated in FIG. 1. It can be seen that the magnetic flux lines must extend ("jump") across a relatively large gap to reach the stator steel. The coil resides in between the magnet and the stator steel. When the coil is energized, a Lorentz Force is imposed on both the coil and the magnet. Since the coil is typically bonded to the stator and thus, held stationary, all of the force is conveyed to the rotor magnet. Since force is created on opposite sides of the magnet, the force being in the form of torque, the actuator creates torque and thus creates motion.

In this example of an actuator, there are 50 turns of AWG #33 magnet wire used, having a coil resistance (R) of around 2.5 ohms, a coil inductance (L) of around 100 microhenries, and producing a torque constant (KT) of around 38,000 Dyne*Centimeters torque per Amp of electrical current passed through the coil.

The toothless arrangement provides benefits. One benefit is the relatively low coil inductance that results from the fact that the coil does not completely surround a closed steel core. Quite the contrary, the entire inside of the actuator is open, containing only the rotor magnet whose permeability is almost the same as that of air.

However, the toothless structure is not without drawbacks. One primary drawback is the amount of heat generated during fast/wide angular rotor motions. Further, the heat that is generated cannot be removed effectively. Both of these drawbacks stem from the fact that, the coil occupies a relatively small space (cross-sectional area), and that it is bonded to the inside of the stator tube, so that it only has a direct attachment on one side (the outside of the coil).

Referring again to FIG. 1, it can be seen that the left, right, and inside of the coils are essentially not attached to any surfaces. Because of this, heat generated by the coil can only be removed from one surface (the outside). Indeed, heat generated at the inside surface of the coil tends to heat up the rotor magnet, which degrades performance and can risk demagnetizing the rotor magnet if the heat exceeds around 100 degrees C.

In order to generate less heat, a lower coil resistance is needed, and in order to decrease the coil resistance, thicker wire must be used.

If, for example, AWG #29 magnet wire was used instead of AWG #33 magnet wire, and was placed into the same coil area, only around 22 turns could be used, providing a coil resistance (R) of 0.48 ohms and a torque constant (KT) of 16,720 Dyne*Centimeters per amp. The coil resistance is certainly lower (because of the thicker wire), but the torque constant is also lower (because there are fewer turns).

When comparing motor designs, it is useful to use figures of merit. One important figure of merit is referred to as a motor constant (KM), which indicates the amount of heat generated for a given amount of torque produced by the actuator. The KM can be calculated several ways, but the easiest way is: $KM=KT/\sqrt{R}$.

The KM of the original actuator with 50 turns, whose KT=38,000 and R=2.5 ohms is 24,033 Dyne*Centimeters per square root of watt. Therefore, to generate 24,033 Dyne*Centimeters of torque, the motor will need to dissipate 1 watt of heat. To generate twice this amount of torque, or 48,066 Dyne*Centimeters, the motor will need to dissipate 4 watts of heat. Doubling the torque output requires doubling the electrical current input. Since heat is proportional to current squared, it illustrates that doubling the current creates four times the heat.

Comparing these values to the same actuator with 22 turns of AWG #29, whose KT=16,720 and R=0.48, reveals that the KM is now 24,133 or, roughly the same as it was before.

This demonstrates an important law of moving magnet actuators. The KM is dictated by the area allocated for the coil. It does not matter how many turns of wire occupy the coil area. If the coil area remains the same and is fully filled with turns, then the KM will remain the same.

For this reason, it is tempting to simply increase the coil area, for example, by increasing the outside diameter of the coil (and inside diameter of the stator tube). However, increasing the diameter of the stator tube will increase the magnetic air-gap, across which the magnetic flux must jump.

Another figure of merit used in magnetic design is called the Permeance Coefficient (PC). The Permeance Coefficient indicates the "operating point" of the rotor magnet. For a simple circuit consisting of magnet, air, and high permeability steel, the Permeance Coefficient can be found by dividing the Magnetic Length, by the total magnetic air-gap. For the electromechanical actuator described above, having rotor diameter (magnetic length) of 0.120 and stator inside diameter of 0.196 inches, the magnetic air-gap is 0.196–0.120=0.076 inches. Therefore the Permeance Coefficient is roughly 0.120/0.076=1.6.

FIG. 3 provides a B/H curve of a typical high performance Neodymium Iron Boron Magnet. The X axis represents the coercivity (H) of the magnet. The Y axis represents the flux density (B). The numbers around the outside (starting at 0.1 and ending at 5.0 on this plot) are the Permeance Coefficient, which dictates the "operating point" of the magnet. This plot illustrates that at a Permeance Coefficient of 1.6 (as is the case for a typical actuator used in the current state of the art), the magnet operates at a flux density of 8.7 kilogauss when the temperature is 20 degrees C.

If the inside diameter of the stator tube is increased to 0.24 inches, by way of example, this will provide more than double the area for coil wires, easily allowing more than 22 turns of AWG #29 magnet wire to be used. However, increasing the inside diameter of the stator tube also increases the magnetic air-gap that the magnetic flux must jump across. Because of this, the magnetic field becomes weaker. This is shown in the plot of FIG. 4, indicated by the Permeance Coefficient of 1.0. The weaker magnetic field requires even more coil turns to produce the same torque constant. The lower Permeance Coefficient also creates a risk of demagnetization at elevated temperatures.

Analysis and testing have shown that the KM of a toothless actuator remains roughly the same between a Permeance Coefficient of 1.0 and 2.0, and thus, there is essentially no well-known way to overcome the problem of heat generation within a toothless actuator. Therefore if heat generation is a performance limiting factor, another type of actuator must be sought.

In the past, some companies have tried to overcome the problem of heat generation by using "toothed" (also referred to as slotted) actuators. By way of example, FIG. 5 illustrates a sectional view of one such actuator used in known optical scanners. In a toothed actuator, the coil is not located between the magnet and the stator steel, and instead is wound around a steel core which forms "teeth" around the magnet. Since the coil is no longer located between the magnet and the stator steel the stator teeth can be much closer to the magnet. As a result, the Permeance Coefficient of toothed actuators is much higher than for toothless actuators.

FIG. 6 illustrates the same magnet B/H curves as was shown in FIGS. 3 and 4, but also highlights the resulting flux density when the Permeance Coefficient is 6. Since the magnet is operating at a higher flux density, now only 38 turns of wire is required to generate 38,000 Dyne*Centimeters per amp, given the same rotor magnet described above. And since the coil area is much greater, thicker wire can be used.

Clearly a "toothed" stator arrangement can solve the heat generation problem. However, a new problem emerges which is one of greatly increased electrical inductance (L). For an actuator shown in FIG. 5, by way of example, the inductance is greater than 300 microhenries, which is around three times the inductance of a "toothless" actuator with the same torque constant.

Referring again to the plot of FIG. 6, inductance is increased because of two factors. The first factor is "external fringe lines" which circulate magnetic flux around the coil, but do not interact with the rotor magnet to create torque. A second factor is "tooth-to-tooth" fringe lines which circulate magnetic flux around a gap between teeth and do not create torque, as illustrated with reference to FIG. 7.

To eliminate external fringe lines, the toothed stator could be rearranged, as shown in FIG. 8. In this arrangement, the coils are wound around teeth that are located completely contained inside the stator, essentially forming a series magnetic circuit between the two coils. Indeed this does help to reduce inductance to about 212 microhenries, but this is still more than double that of a toothless actuator that produces the same torque.

To reduce the inductance even further, the tooth-to-tooth fringe must be reduced, and thus the gap between stator teeth must be opened up. For example, if the gap between stator teeth is increased to 0.050, the inductance becomes 180 microhenries. If the gap between stator teeth is increased even further—to 0.070, the inductance becomes 157 microhenries. This is still more than 50% higher than a slotless actuator, but this may be tolerable for certain applications.

However, increasing the gap between stator teeth has negative consequences. The largest being that the actuator will tend to "cog" toward angles away from the center, since the North and South poles of the rotor magnet will strongly orient themselves in the direction of the stator teeth themselves. A small amount of cogging can be tolerated by the servo system located outside the optical scanner, but a large amount of cogging is detrimental to performance and thus, highly undesirable.

For example, with the toothed or slotted actuator described above with reference to FIG. 8, whose gap between teeth is 0.030 inches, the cogging torque is 14,000 Dyne*Centimeters at 20 degrees. When the gap between teeth is increased to 0.036 inches, the cogging torque is 22,000 Dyne*Centimeters at 20 degrees. When the gap between teeth is increased to 0.050 inches, the cogging torque increases to 40,000 Dyne*Centimeters at 20 degrees. When the gap between teeth is increased to 0.070 inches, the cogging torque increases to 85,000 Dyne*Centimeters at 20 degrees. A cogging torque of 14,000 Dyne*Centimeters is tolerable, but higher cogging torques are not.

Since limiting the inductance in a toothed actuator also means increasing the cogging torque, this means that a toothed actuator should not be used if inductance is a performance-limiting factor.

To reiterate, the typical toothless actuator is typically not capable of delivering a high torque constant along with low coil resistance, and a typical toothed actuator is not capable of delivering low coil inductance. Thus, there is clearly a need for an electromechanical rotary actuator that provides high torque constant and low coil resistance along with a low coil inductance.

SUMMARY OF THE INVENTION

In keeping with the teachings of the present invention, an electromechanical rotary actuator may comprise a rotor and a stator that includes one or more slots into which one or more coils are placed. The stator may also include a rotor position restoring means which overcomes cogging toward the outside of the desired rotation range. In some embodiments, the rotor position restoration means may include one or more restoring magnets, and in other embodiments the rotor position restoring means may include a contoured cavity within the stator proximate the rotor.

One embodiment may comprise a limited rotation rotary actuator including a stator having an aperture extending axially therein and at least two teeth having contoured ends forming at least a portion of the aperture, wherein distal ends of the at least two teeth are in a spaced relationship thus forming a gap therebetween. A rotor may have a two-pole diametral magnet bidirectionally operable with the stator and extending into the aperture thereof, wherein a separation is formed between the magnet and the contoured ends of the at least two teeth. At least one electrical coil may extend around at least a portion of one tooth of the at least two teeth, wherein the electrical coil is excitable for providing bidirectional torque to the rotor. Rotor restoring means may be carried within at least one tooth of the at least two teeth, wherein the rotor restoring means is positioned for restoring the rotor to a central rotation angle when current is withheld to the at least one electrical coil.

One embodiment may comprise a non-uniform separation formed between the magnet and the contoured ends of at least two teeth. The non-uniform separation results in a greater separation proximate a central portion of the teeth contoured ends than the separation proximate the distal ends thereof. The non-uniform separation provides a restoration torque resulting in a spring-like return-to-center action of the rotor.

Yet another embodiment may comprise a limited rotation rotary actuator including a stator having an aperture extending axially therein and at least two teeth having contoured ends forming at least a portion of the aperture, wherein distal ends of the at least two teeth form a gap therebetween. A rotor may include a two-pole diametral magnet bidirectionally operable within the aperture. At least one first slot may extend longitudinally within at least one tooth and at least one second slot may extend from the aperture to within the stator. The at least one second slot is aligned more or less orthogonally to the at least one first slot. An electrical coil extends within the at least one second slot and is excitable for providing bidirectional torque to the rotor. Rotor restoring means is carried within at least a single first slot of the at least one first slot. The rotor restoring means is positioned for restoring the rotor to a central rotation angle when current is withheld to the at least one electrical coil.

In yet another embodiment, a limited rotation rotary actuator may comprise a stator having an aperture extending axially therein and at least four teeth having contoured ends forming at least a portion of the aperture. Distal ends of the at least four teeth are in a spaced relationship to thus forming a gap therebetween. A rotor having four-pole magnet means extends into the aperture. At least one electrical coil extends around at least a portion of one tooth of the at least four teeth. The electrical coil is excitable for providing bidirectional torque to the rotor. Rotor restoring means are carried within at least one tooth of the at least four teeth. The rotor restoring means is positioned for restoring the rotor to a central rotation angle when current is withheld to the at least one electrical coil.

BRIEF DESCRIPTION OF THE DRAWINGS

For a fuller understanding of the invention, reference is made to the following detailed description, taken in connection with the accompanying drawings illustrating various embodiments of the present invention, in which:

FIG. 9A is a perspective view illustrating one embodiment of an actuator according to the teachings of the present invention;

FIG. 9B is an exploded view of stator sections to be brought together to form a stator of FIG. 9A;

FIG. 9C is one embodiment of a rotor having a magnet and shaft operable with the embodiment of FIG. 9A;

DETAILED DESCRIPTION OF EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
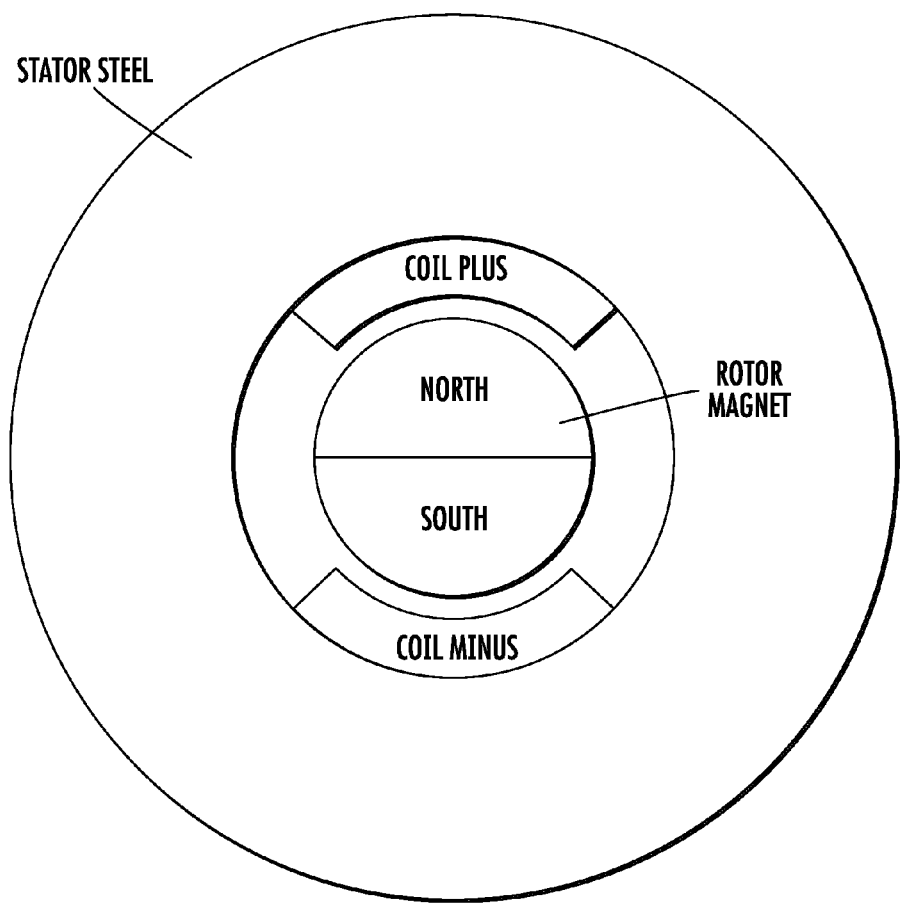
FIG. 1 illustrates a stator and rotor combination found in a toothless actuator of the current state of the art.
Figure 2:
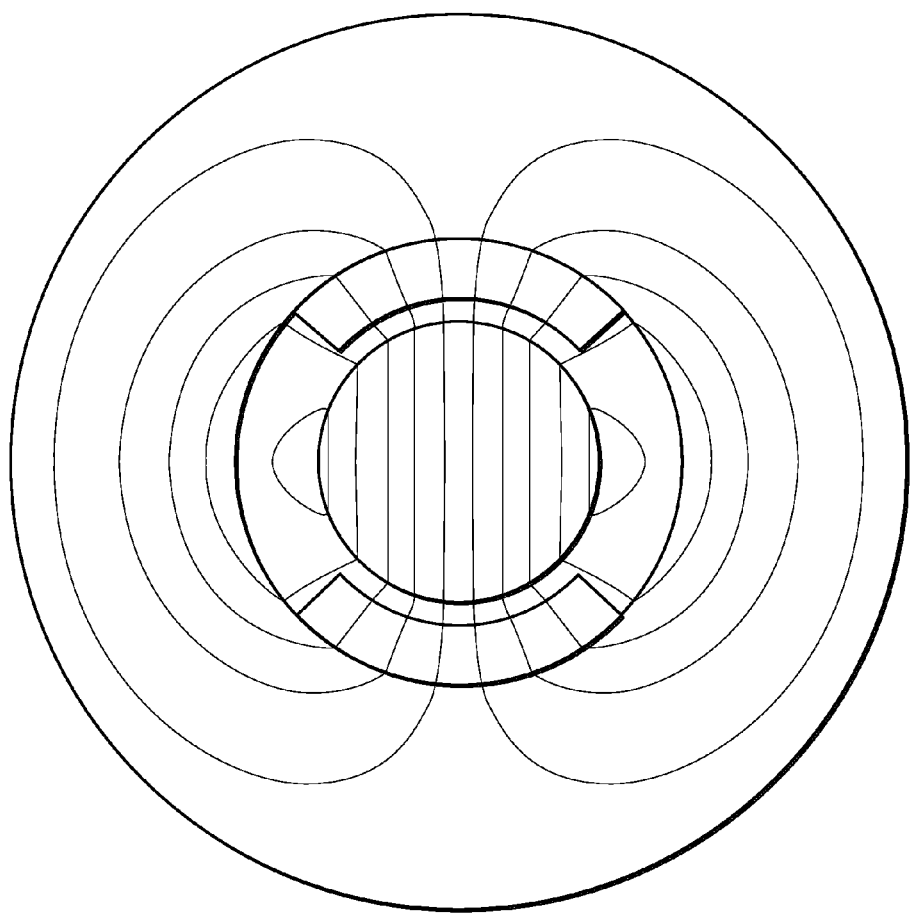
FIG. 2 illustrates the magnetic flux lines within a toothless stator and rotor combination of the current state of the art.
Figure 3:
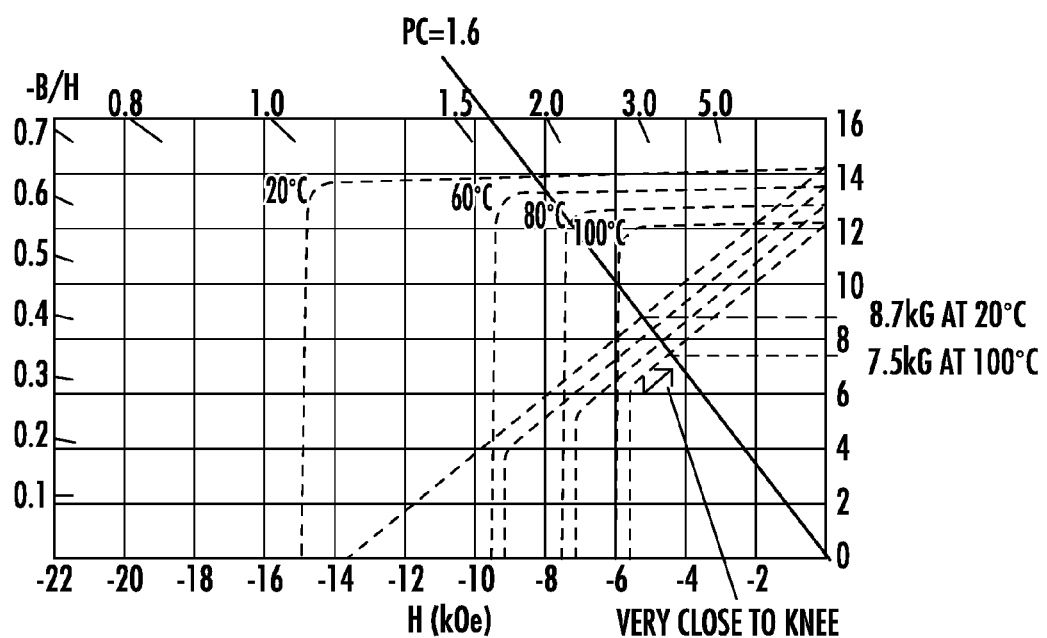
FIG. 3 illustrates the B/H curves and relevant information that pertains to the magnet used in a typical toothless optical scanner.
Figure 4:
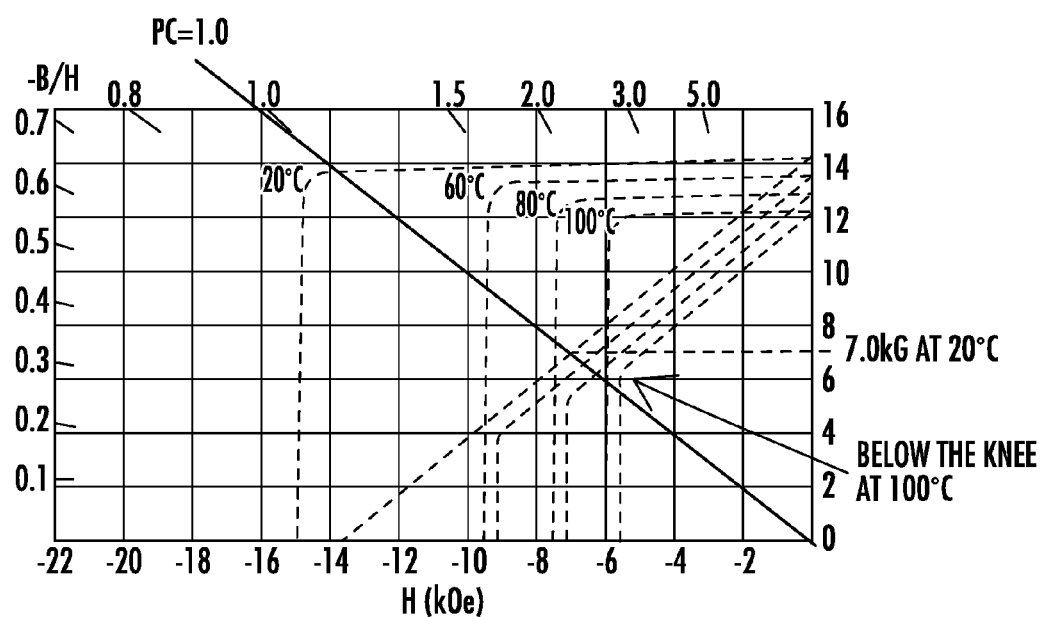
FIG. 4 illustrates the B/H curves and relevant information that pertains to a magnet used in a toothless scanner whose stator ID is increased.
Figure 5:
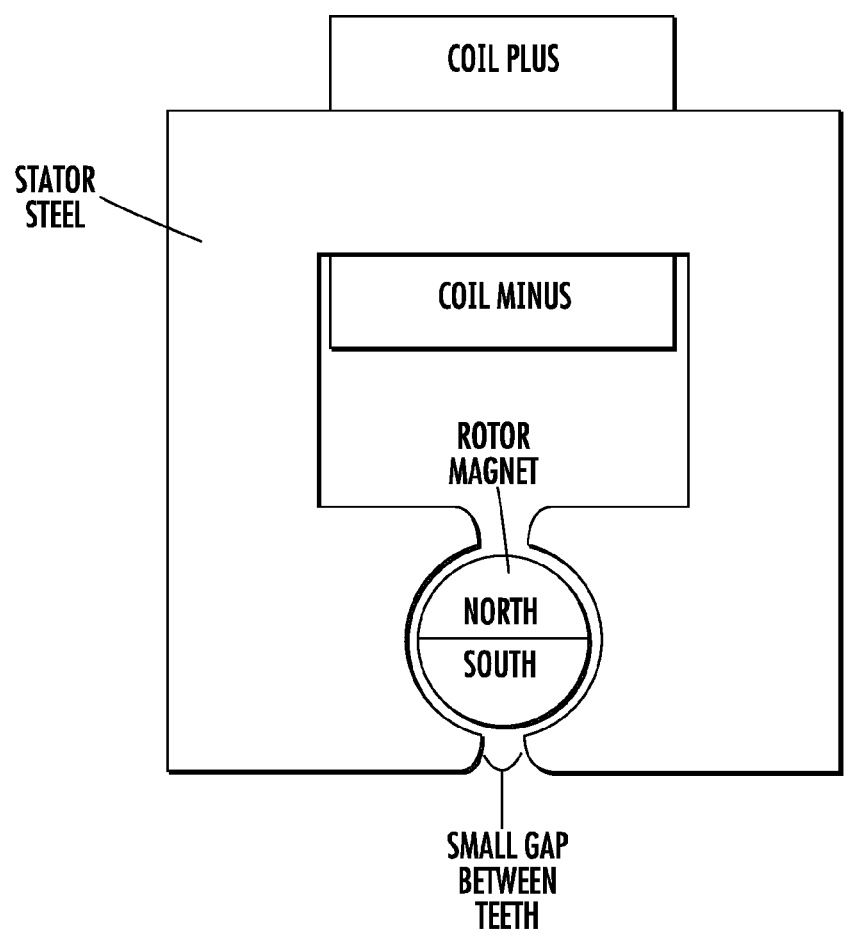
FIG. 5 illustrates the stator and rotor combination found in toothed actuators of the current state of the art.
Figure 6:
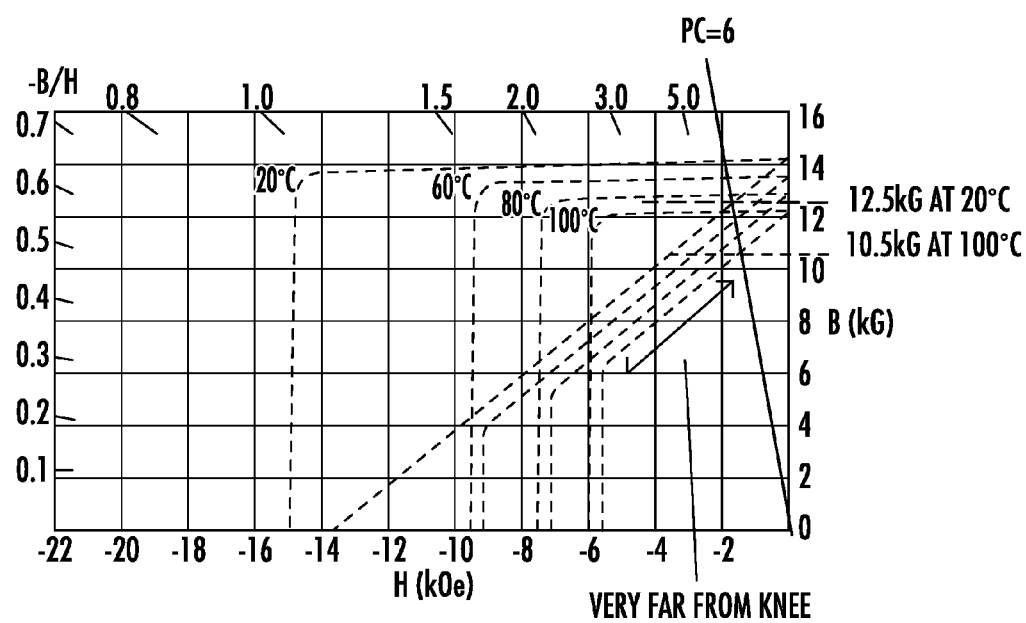
FIG. 6 illustrates the B/H curves and relevant information that pertains to the magnet used in a toothed actuator.
Figure 7:
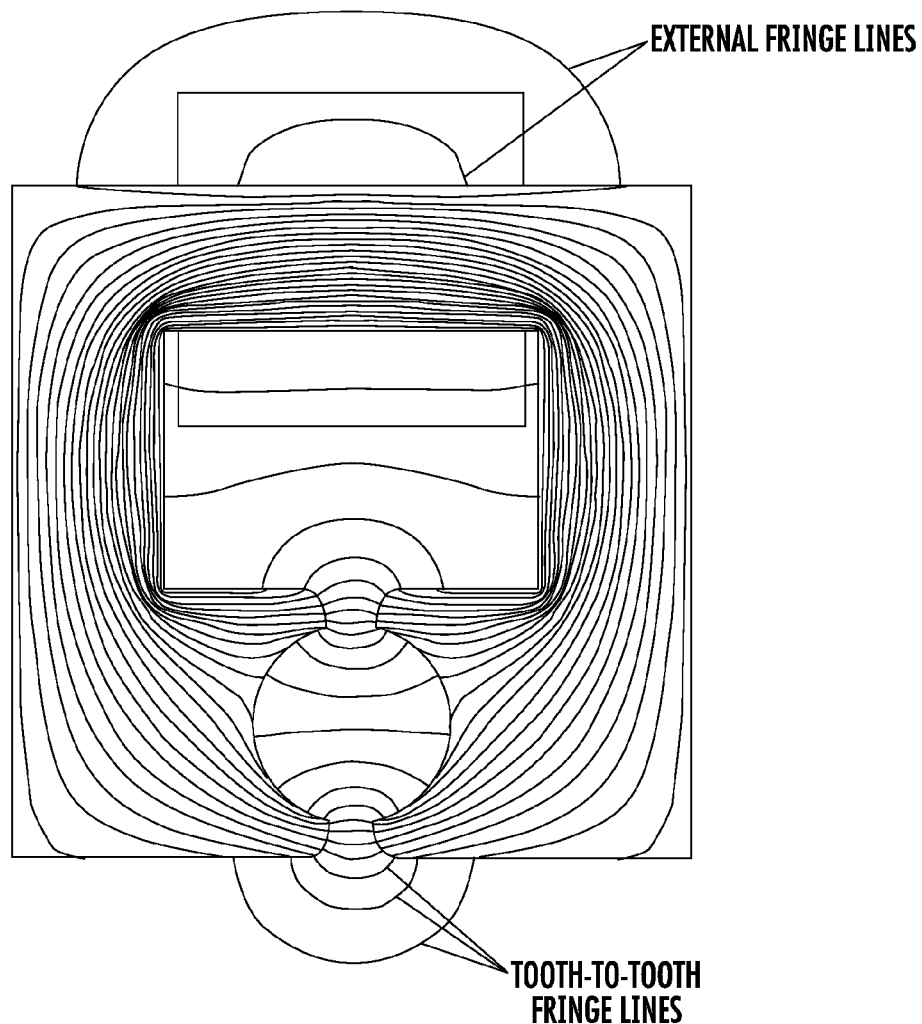
FIG. 7 illustrates the magnetic flux lines and fringe lines found within a toothed stator of the current state of the art.
Figure 8:
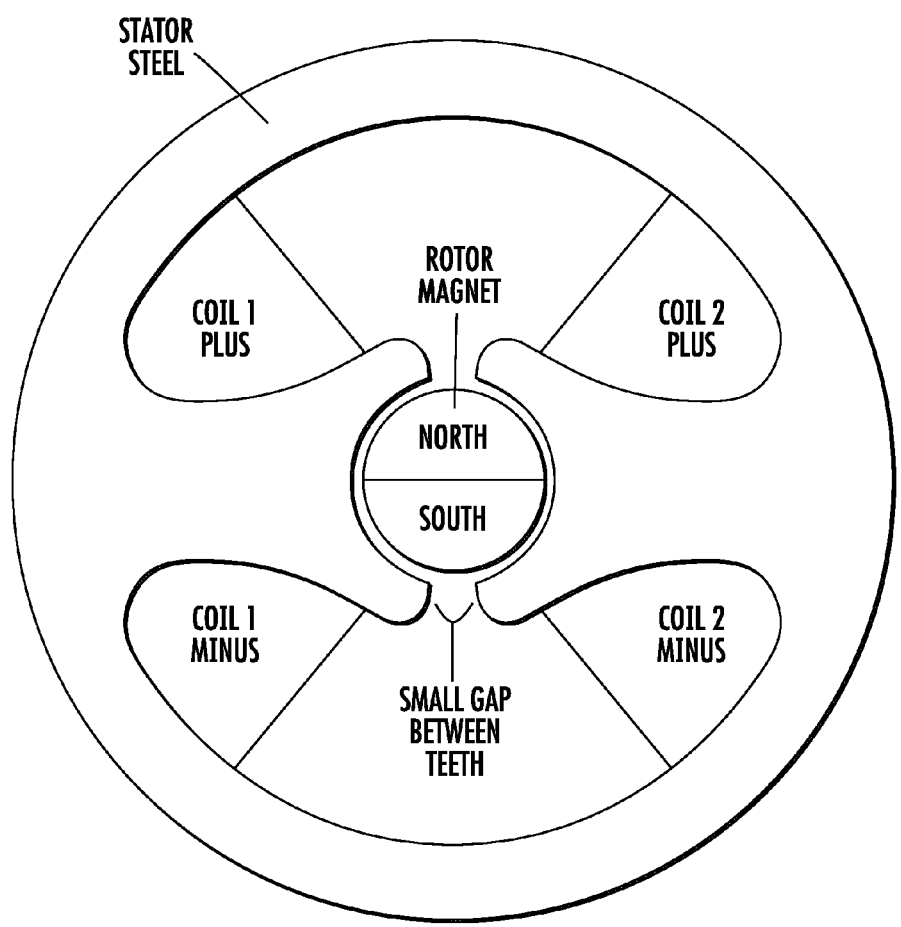
FIG. 8 illustrates the stator and rotor combination found in another toothed actuator of the current state of the art.
Figure 9:
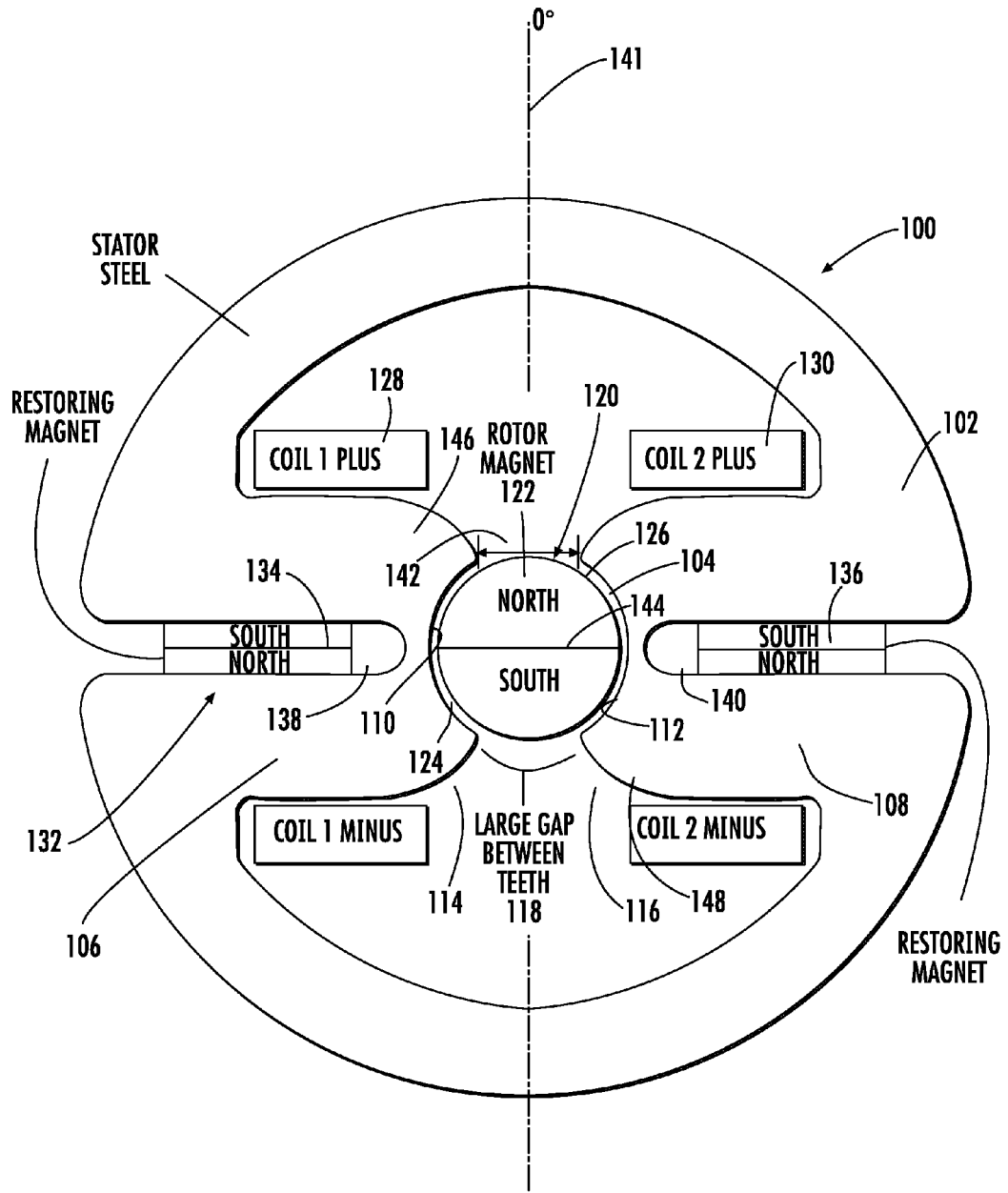
FIG. 9 illustrates one embodiment of the present invention, wherein a two-tooth actuator with restoring magnets is illustrated by way of example.

Referring initially to FIG. 9, one embodiment of the present invention is herein described as an electromechanical, limited rotation, rotary actuator 100. The actuator, herein described by way of example, comprises a stator 102 having an aperture 104 extending axially therein and at least two teeth 106, 108 having contoured ends 110, 112 forming at least a portion of the aperture. Distal ends 114, 116 of the teeth 106, 108 are in a spaced relationship and form a gap 118 therebetween. A rotor 120, for the embodiment herein described by way of example, includes a two-pole diametral magnet 122 bidirectionally operable with the stator 102 and extending into the aperture 104. A separation 124, herein an air-gap, is formed between an outer surface 126 of the magnet 122 and the contoured ends 110, 112 of the teeth 106, 108. For the example embodiment herein described, two electrical coils 128, 130 each respectively extend around a portion of each tooth 106, 108. The electrical coils 128, 130 are excitable for providing bidirectional torque to the rotor 120. Rotor restoring means 132 in the form of restoring magnets 134, 136 are carried within slots 138, 140 in each tooth 106, 108 longitudinally extending toward the aperture 104. The rotor restoring means 132 may comprise only one restoring magnet. The rotor restoring means 132 is positioned for restoring the rotor 120 to a central rotation angle 142 when current is withheld from the electrical coils 128, 130. For the embodiment herein described by way of example, the two teeth 106, 108, while not limiting, are radially aligned. A length dimension 142 of the gap 118 is at least forty percent of a diameter of the diametral magnet 122.

One simple way to make the rotor 120 is to use a single cylindrical piece of magnet material that is diametral magnetized. The rotor 120 may be made from one or more magnets, as long as it provides a north pole diametrically opposed from the south pole. For embodiments described herein by way of example, torque, inductance and resistance values are valid for a rotor magnet having a diameter of 0.12 inches and a length of 1.3 inches and made with high-grade Neodymium Iron Boron material, and the stator having an inside diameter of 0.136 inches.

The stator 102 illustrated with reference again to FIG. 9 comprises stator steel with each tooth 106, 108 providing a consistent round separation 124 (an air gap) around the rotor magnet 122, which may have a smooth circular cross section or may include facets, by way of further example without departing from the teachings of the present invention. The gap 118 is relatively large when compared to known actuators (around 40% of the magnet diameter or greater) which would normally cause the rotor magnet 122 to experience a strong cogging toward the outside of a desired rotation range. The restoring magnets 134, 136 are inserted within the slots 138, 140 in the teeth 110, 112 of the steel stator 102 for biasing the upper portion 146 of each tooth 106, 108 to be south, and the lower portion 148 of each tooth to be north as herein described with reference again to FIG. 9. The north pole of the rotor magnet 122 is attracted evenly between the south pole of each restoring magnet 134, 136, and likewise the south pole of the rotor magnet is attracted evenly between the north pole of each restoring magnet. This overcomes the cogging action, and keeps the rotor magnet 122 oriented toward the center 141 of the range of rotation angles. It is noted that the line appearing to divide north and south poles is diagrammatical only and is not intended to limit the magnet to distinct pole separations.

The stator 102 illustrated in cross section in FIG. 9 comprises a cylindrical shape. It will be understood by those skilled in the art that alternate shapes may be employed such as the rectangular cross section shape of the actuator 100A illustrated in FIG. 9A without departing from the teachings of the present invention. Further, the actuator 100, 100A may comprises multiple stator sections 150, 152. Further, the stator 102 may be formed from laminations 154, as illustrated with continued reference to FIG. 9 and now to FIG. 9B. The rotor magnet 122 for the embodiment herein described by way of example comprises a Neodymium Iron Boron material. The rotor magnet 122 may be integrally formed with a shaft 156, wherein the shaft may carry an optical element 158 carried by the shaft, as illustrated with reference to FIG. 9C. The optical elements may comprise a mirror, prism or filter effectively used in optical scanners.

With continued reference to FIGS. 9A, 9B and 9C, the shaft 156 may be made of stainless steel, although practically any material can be used as long as the material can withstand the torque produced by the actuator 100, 100A and any external load connected to the actuator within the environment being operated. As above described, the shaft 156 may be integrally formed with the rotor magnet 122 or may be attached to the magnet using adhesives such as epoxy. The stator 102 illustrated with reference to FIGS. 9A and 9B, comprises multiple, thin, sheets of metal, herein referred to as the laminations 154, as above described. The laminations 154 may be assembled into the stator sections 150, 152 to form a desired shape. The shape of each lamination 154 may be created by metal stamping, by laser cutting, by photo-etching, by water-jet cutting, or by other known methods of forming a shape from sheet metal. As described in U.S. application Ser. No. 13/446,500 for an electromechanical limited rotation rotary actuator, the disclosure of which is herein incorporated by reference in its entirety, the laminations 154 may be made from a silicon-steel material known as M-19, a material specially made for motors and electrical transformers. However, many different materials will work, as long as the material is magnetically conductive. A few possible alternative materials include a cold-rolled steel (for example Q-195) and magnetic stainless steel (stainless steel 416 by way of example). Point 160 and socket 162 potion of each lamination 154 are alternated on each lamination layer creating an overlapping area 164 between the laminations 154. As a result, air-gap is effectively filled with the magnetically-conductive, lamination material on a neighboring layer, due to the overlapping area.

Figure 10:
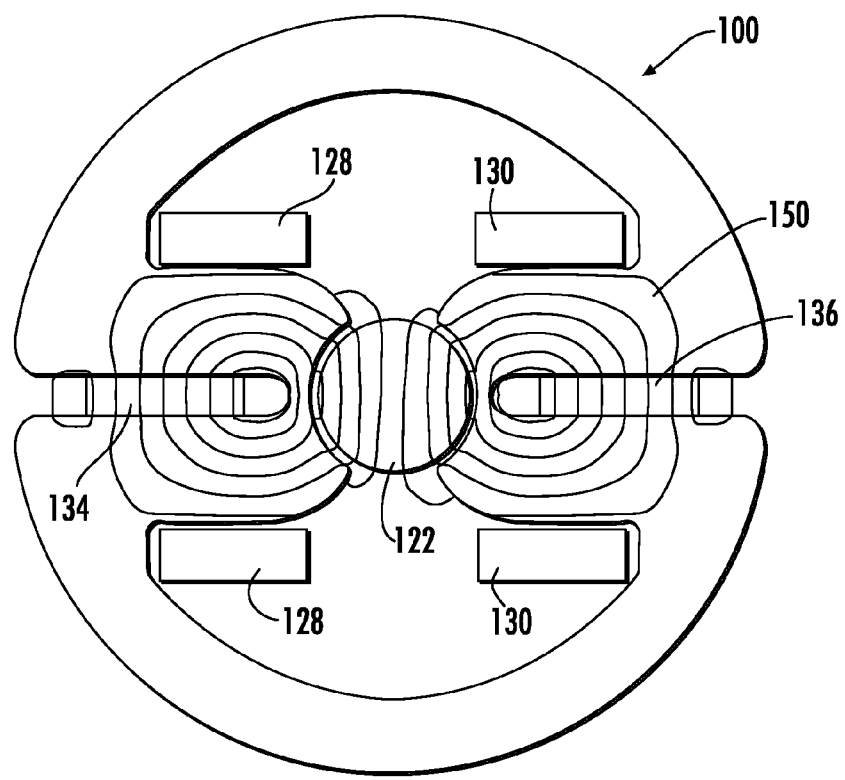
FIG. 10 illustrates the magnetic flux lines in the embodiment shown in FIG. 9.

FIG. 10 illustrates flux lines 150 between the rotor magnet 122 and the restoring magnets 134, 136. When electrical current is passed through the coils 128, 130, each tooth effectively becomes an electro magnet, which contributes torque and motion of the rotor magnet 122.

By way of example for the actuator shown in FIG. 9, with 19 turns of AWG #25 magnet wire around each tooth, the Torque Constant (KT) is around 38,000 Dyne*Centimeters per amp, Coil Resistance (R) is 0.1 ohms, and Coil Inductance (L) is around 157 microhenries.

Figure 11:
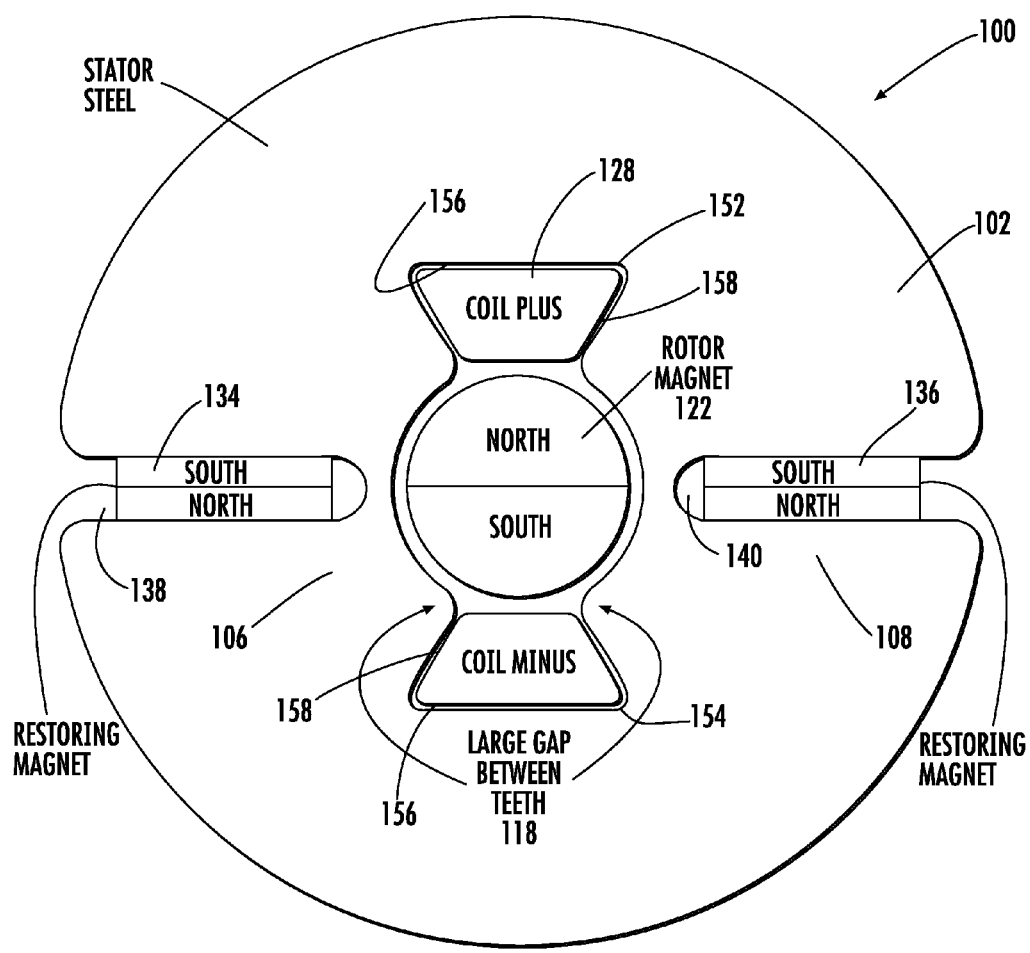
FIG. 11 illustrates another embodiment of the present invention, wherein an insulated wire coil is located in two slots and employing restoring magnets.

With reference now to FIG. 11, an embodiment of the actuator 100 may comprise the one electrical coil 128 extending around a portion of each tooth 106, 108 and about the gap 118 formed between the opposing teeth distal ends 114, 116. A coil slot 152 is formed within the stator 102 and terminates at the gap 118, resulting in a single coil extending within the coil slot 152. Alternatively, the single coil may extend within each of two coil slots 152, 154 as illustrated in FIG. 11, wherein opposing coil slots 152, 154 formed on opposing sides of the rotor magnet 122 have the single coil 128 extending within the opposing coil slots. The single coil 128 is closely fitted within the coil slots 152, 154 for transmitting heat generated in the coil 128 to the stator 102.

Figure 12:
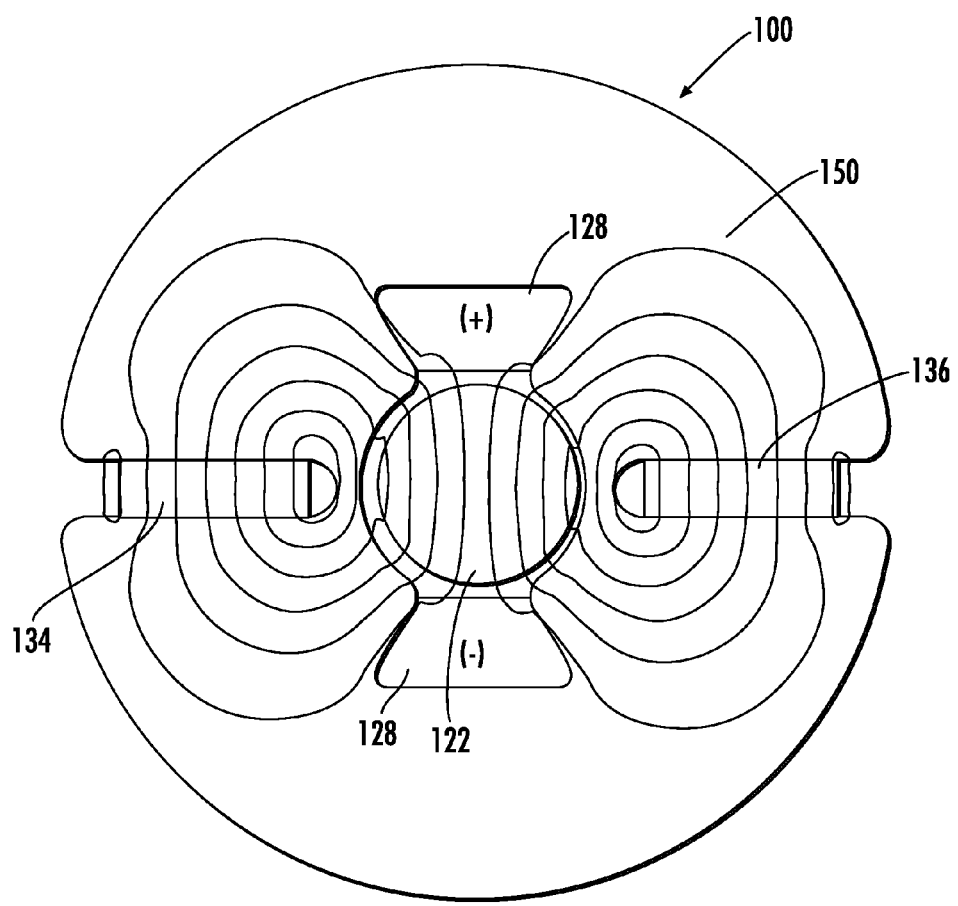
FIG. 12 illustrates the magnetic flux lines in the embodiment shown in FIG. 11.

The coil 128 is thus positioned closer to the rotor magnet 122 then as above described for the embodiment of FIG. 9. With continued referee to FIG. 11, there is able to be a very wide gap 118 between the teeth 106, 108 formed by the coil slots 152, 154. This wide gap 118 can have a dimension around 40% of the magnet diameter 144 or greater. The restoring magnets 134, 136 are placed outside of the rotor magnet 122, and are effectively buried within the steel stator 102 using the slots 138, 140 within the teeth 106, 108, as above described. FIG. 12 illustrates the flux lines 150 between the rotor magnet 122 and the restoration magnets 134, 136 for the embodiment of FIG. 11.

For the actuator 100 illustrated with referee to FIG. 11, with 38 turns of AWG #31 magnet wire placed in each coil area, the Torque Constant (KT) is around 38,000 Dyne Centimeters per amp, Coil Resistance (R) is 1.25 ohms, and Coil Inductance (L) is around 120 microhenries. Note that this delivers the same Torque Constant (KT) and having similar Coil Inductance (L) as the toothless actuator, but with half the coil resistance. Also note that the coil slot surface 156 surrounds the coil 128 on three of its four sides for the embodiment herein illustrated, thus providing a desirable and improved thermal path to remove heat from the coil.

Figure 13:
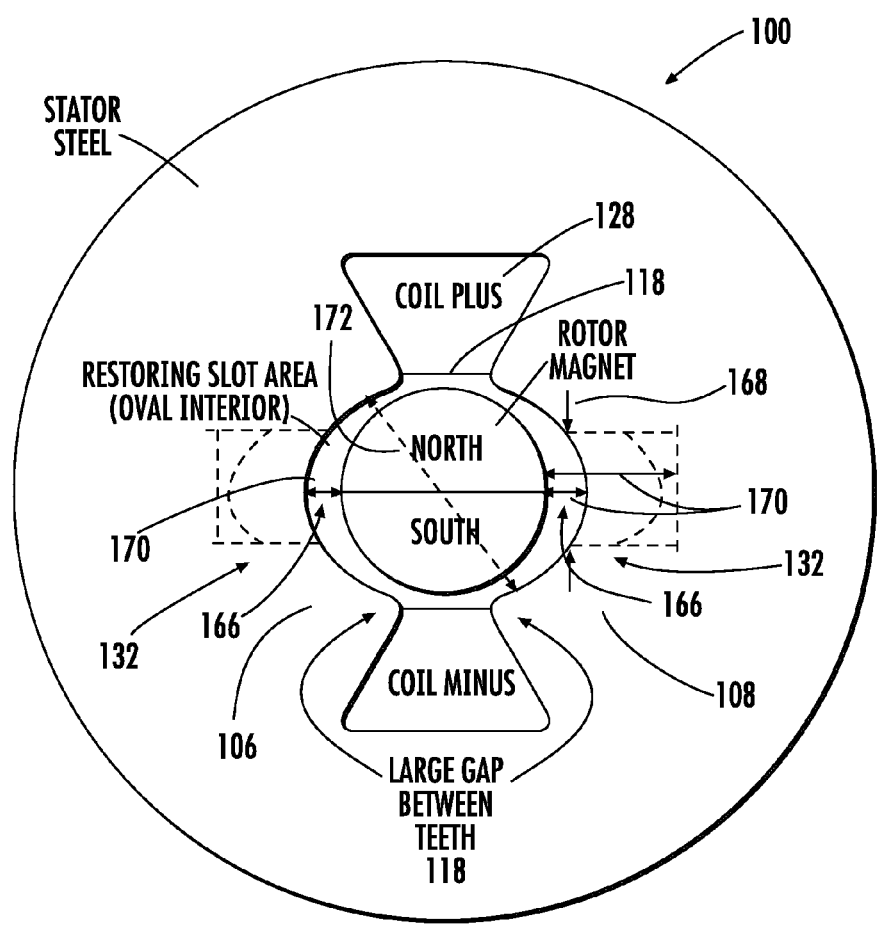
FIG. 13 illustrates yet another embodiment, wherein the wire coil is located in two slots but without use of restoring magnets.

FIG. 13 illustrates another embodiment of the present invention. This embodiment is similar to that shown in FIG. 11, insomuch that there is only one coil area on each side of the rotor magnet. However, in this embodiment, there are no restoring magnets, as presented in the embodiment illustrated with referee to FIG. 11. Instead, the rotor position restoring means 132 is provided and facilitated by the an inside shaping of stator steel, herein referred to as a restoring slot area 166, which is effectively a feature placed at 90-degree angles with respect to coil plus and coil minus of the coil 128. As long as a width 168 of this restoring slot area 166 is made wider than the gap 118 between the teeth 106, 108, and the depth 170 is made greater than 25% of the gap between the rotor magnet 122 and stator aperture effective inside diameter 172, there will be a restoring action which tends to restore the rotor 120 to a central range of rotation angles when no current is applied to the coils. The restoring slot area 166 may not have a symmetric or uniform surface, but rather may be oval, as illustrated with continued referee to FIG. 13, whose width 168 is effectively continually increasing toward the left and right. Thus the restoring means 132 comprises a non-uniform separation formed between the magnet 122 and the contoured ends of the teeth 106, 108, the non-uniform separation resulting in a greater separation proximate a central portion of the teeth arcuate ends than the separation proximate the distal ends thereof, and wherein the non-uniform separation provides a restoration torque resulting in a spring-like return-to-center action of the rotor. The width 168 is greater than the gap 118, wherein the shape of the area 166 may be as further illustrated with reference to the dashed lined of FIG. 13.

Figure 14:
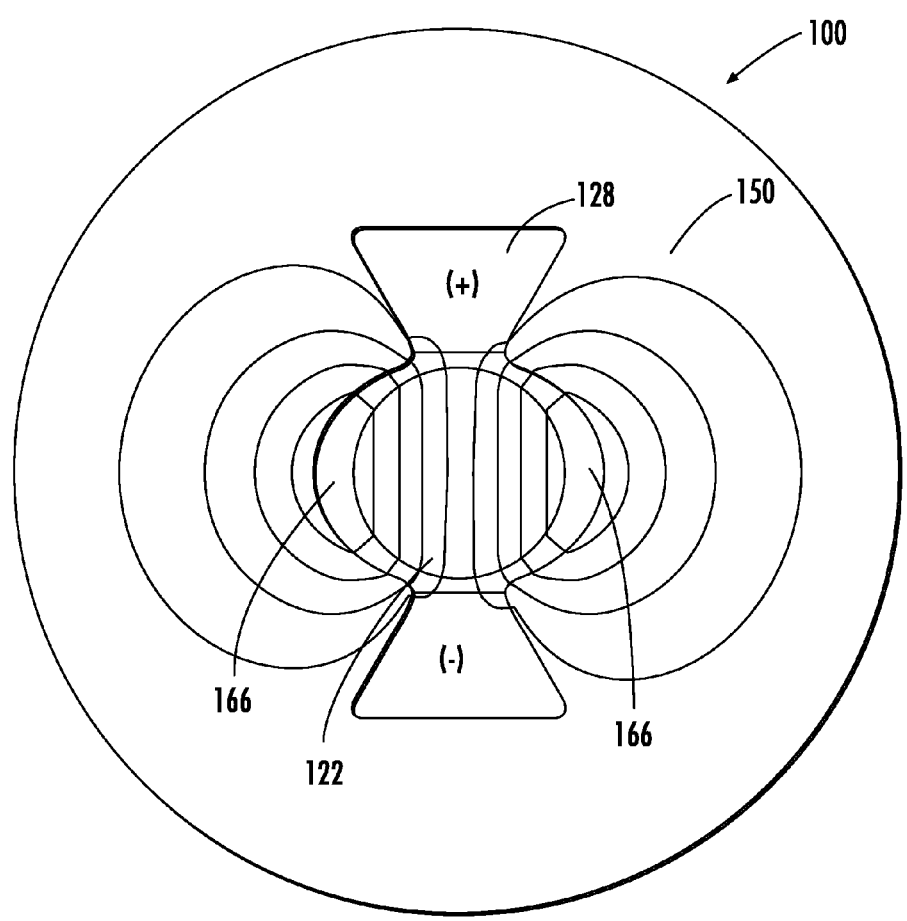
FIG. 14 illustrates the magnetic flux lines in the embodiment shown in FIG. 13.

FIG. 14 illustrates the flux lines 150 for the embodiment of FIG. 13.

By using a cylindrical rotor magnet 122 that is diametral magnetized, a sinusoidal flux-versus-angle profile results from the magnet. This in turn produces an approximately sinusoidal output-torque versus angle profile of the actuator (when current is applied to the coils). Moreover, using a magnetic air-gap, the oval shape of the area 166 by way of example, whose width 168 continually increases from the top-bottom toward the left-right, an approximately sinusoidal spring-like return-to-center torque results. In this configuration, since a shape of the output-torque-versus-angle profile (when current is applied to the coils) is the same as a spring-like restoration-torque versus angle (return-to-center) profile, the net result is that the output-angle versus input-current profile is nearly linear over an angle of around +/−60 mechanical degrees, a desirable result.

In embodiments of the present invention, using the restoring magnets or the restoring slots improves torque output from the actuator. Actuator embodiments that do not use the restoring magnets as their rotor position restoration means will generally have around 8% to 10% lower Torque Constant (KT) for a given number of coil turns.

With this being the case, for the actuator illustrated with reference again to FIG. 13, with 38 turns of AWG #31 magnet wire placed in each coil area, the Torque Constant (KT) is around 34,200 Dyne Centimeters per amp, Coil Resistance (R) is around 1.25 ohms, and Coil Inductance (L) is around 120 microhenries. Note that this delivers nearly the same Torque Constant (KT) and with similar Coil Inductance (L) as the "toothless" actuator, but with half the coil resistance. Also note that the coil area surrounds the coil on three sides, providing a very good thermal path to remove heat from the coil.

Figure 15:
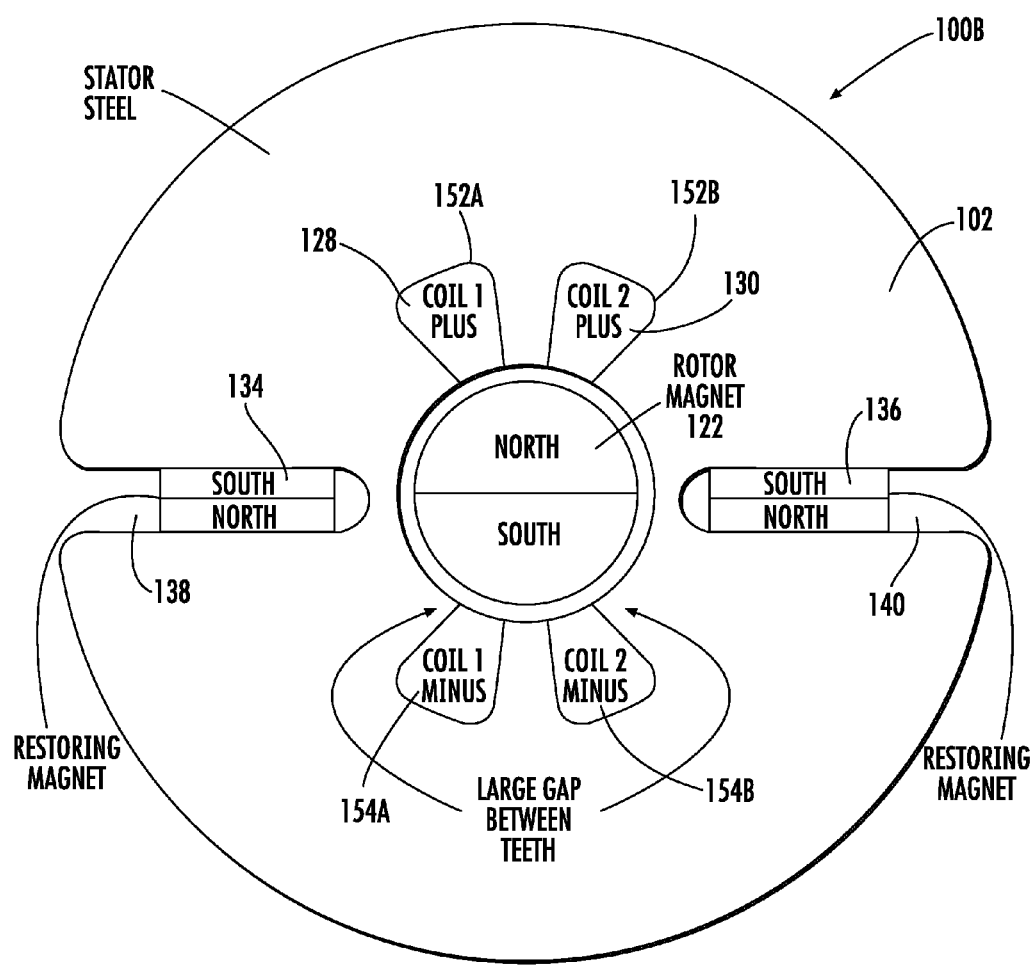
FIG. 15 illustrates another embodiment of the present invention, wherein the wire coil is located in four slots and with restoring magnets.
Figure 16:
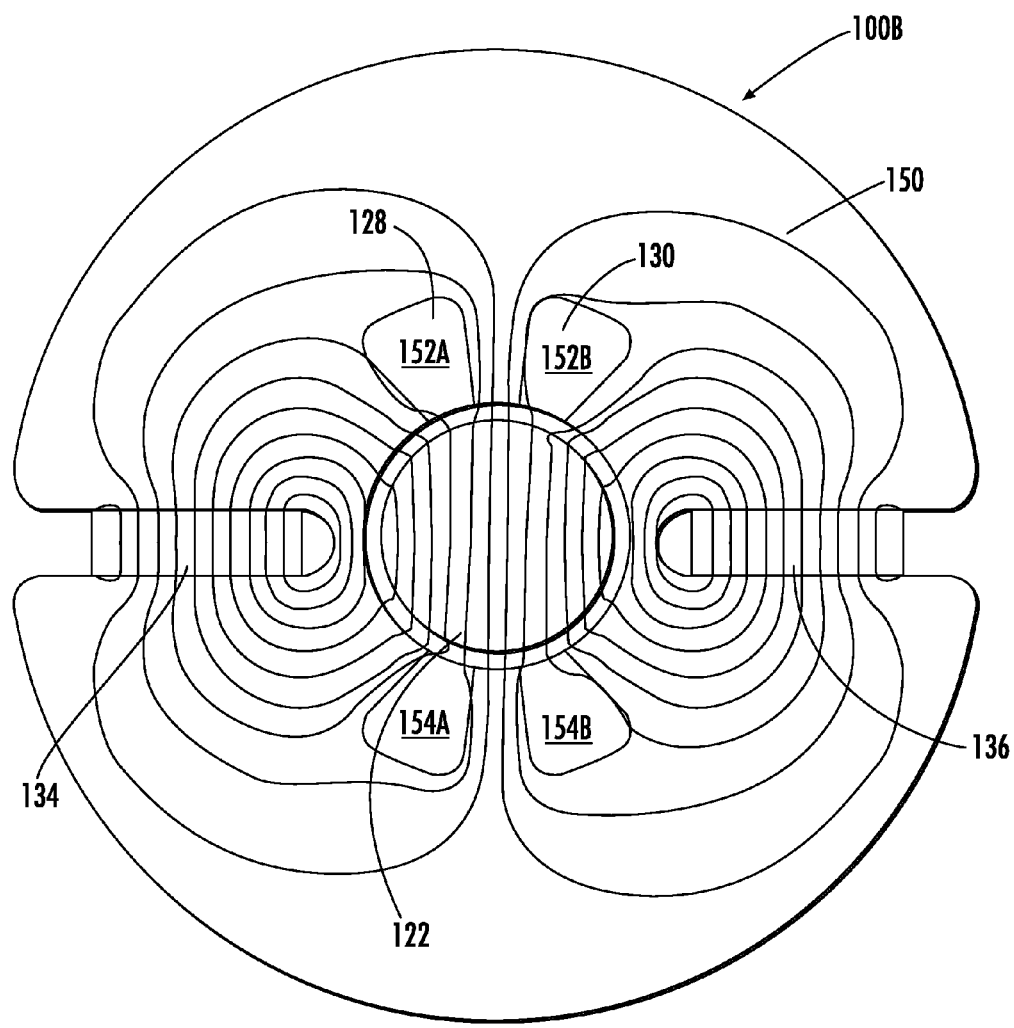
FIG. 16 illustrates the magnetic flux lines in the embodiment shown in FIG. 15.

FIG. 15 illustrates yet another embodiment of the present invention. In this embodiment, the actuator 100B includes two coil slots 152A, 152B, 154 A, 154B on each side of the rotor magnet 122, all of which are located very close to the magnet. The restoring magnets 134, 136 are placed within the slots 138, 140 positioned outside the rotor magnet 122, as above described, and are effectively buried within the stator steel. The coil 128 extends into the slots 152A and 154A. The coil 130 extends into the slots 152B, 154B. The benefit of this arrangement is that the torque-versus-position profile is a desirably flatter than all of the other actuators presented (both known and embodiments herein described). FIG. 16 illustrates the flux lines between the rotor magnet and Restoration Magnets for the embodiment of FIG. 15.

For the actuator shown in FIG. 15, with 19 turns of AWG #31 magnet wire placed in each coil area, the Torque Constant (KT) is 38,000 Dyne Centimeters per amp, Coil Resistance (R) is 1.25 ohms, and Coil Inductance (L) is around 120 microhenries. Note that this delivers the same Torque Constant (KT) and with similar Coil Inductance (L) as the "toothless" actuator, but with half the coil resistance. Also note that the coil area almost completely surrounds the coil, providing a very good thermal path to remove heat from the coil.

Figure 17:
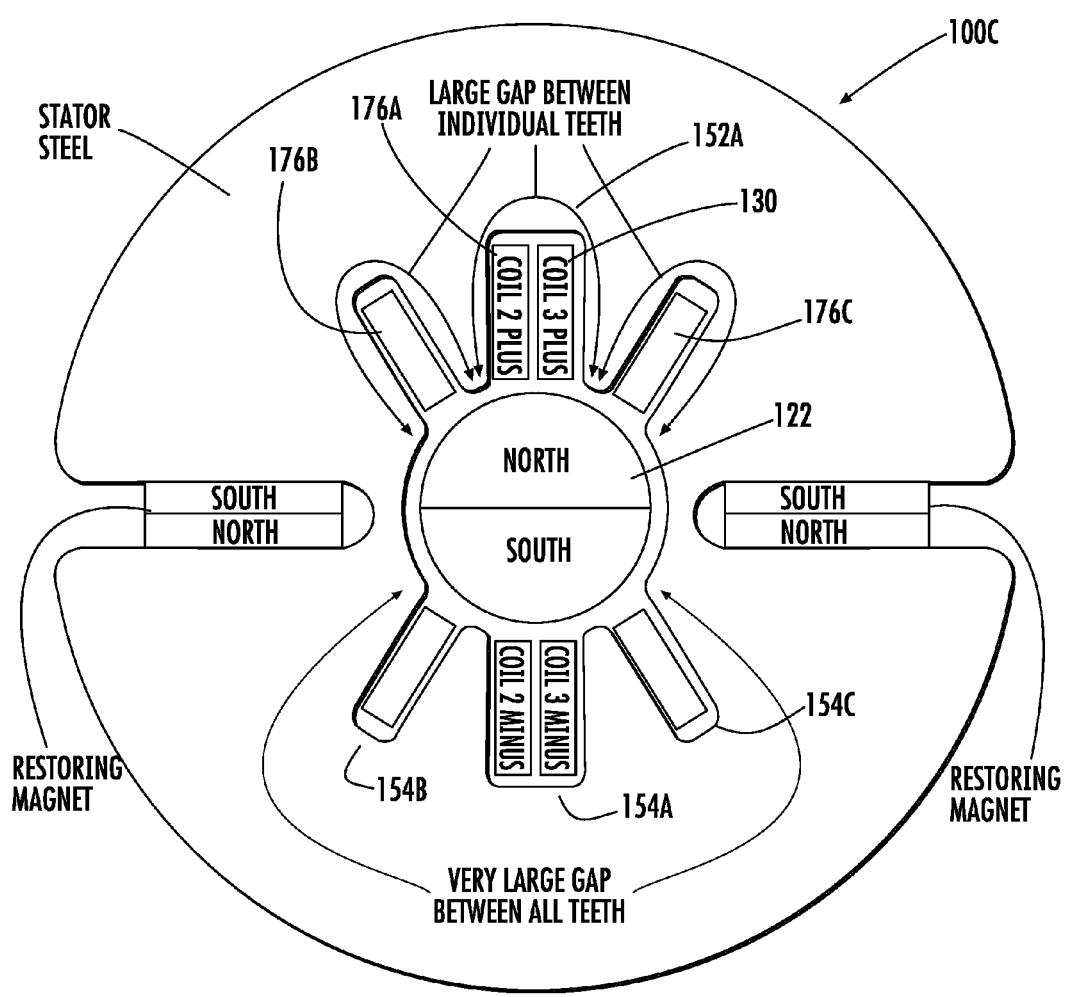
FIG. 17 illustrates another embodiment of the present invention, wherein the wire coil is located in six slots and wherein restoring magnets are employed.
Figure 18:
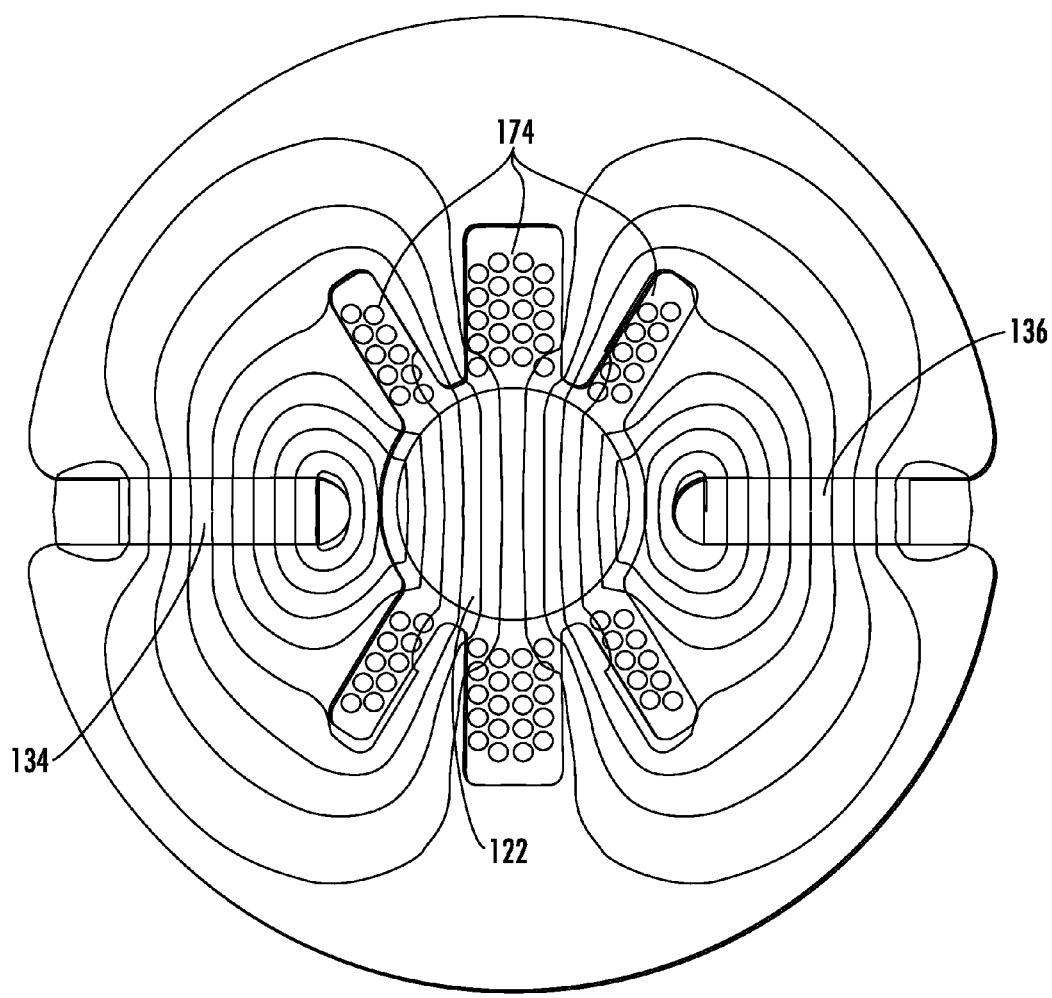
FIG. 18 illustrates the magnetic flux lines in the embodiment shown in FIG. 17, and showing individual turns of wire.
Figure 19:
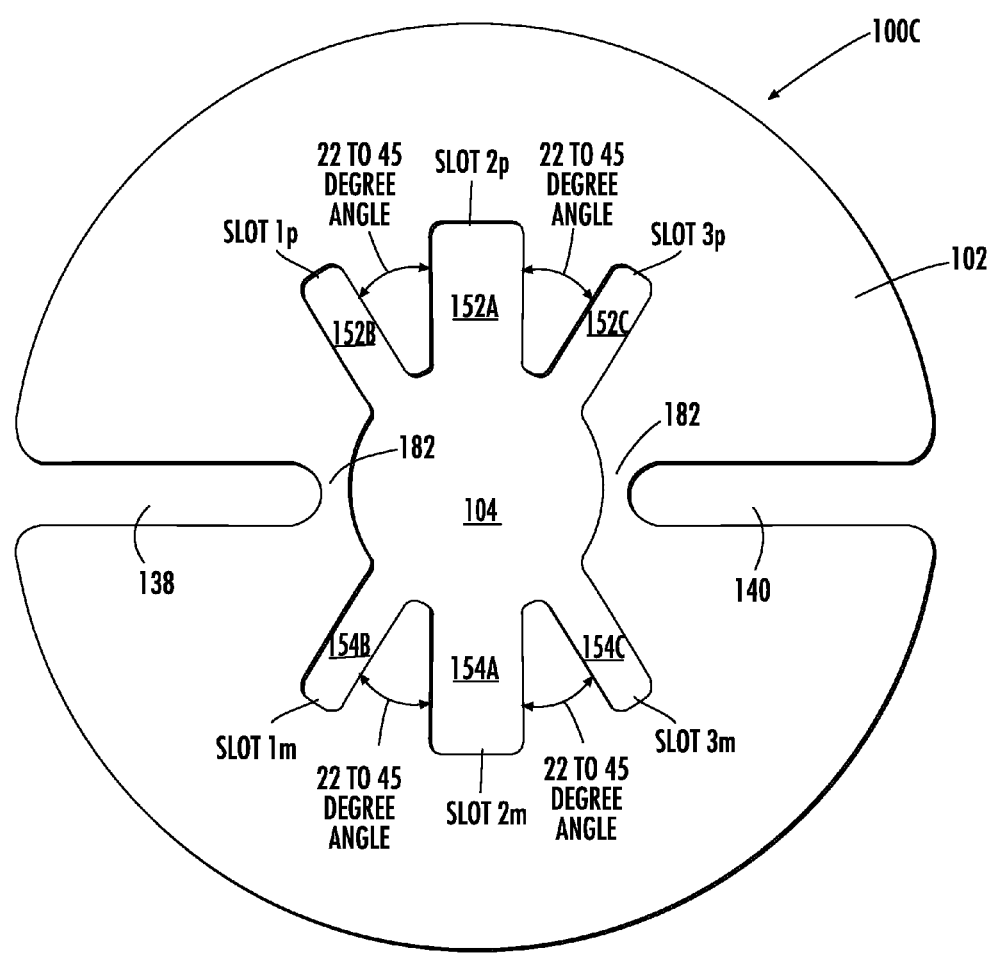
FIG. 19 illustrates some features of the stator configuration of the embodiment shown in FIG. 18.

FIG. 17 illustrates yet another embodiment of the present invention. In this embodiment, the actuator 100C includes three coil slots 152 A, B, C and 154 A, B, C on each side of the rotor magnet 122, all of which are located very close to the magnet. FIG. 18 illustrates the flux lines between the rotor magnet 122 and the restoration magnets 134, 136 for the embodiment of FIG. 17. FIG. 18 also shows the individual turns 174 of wire in the coils 176 A, B, C. In FIG. 19, these coil slots are designated Slot 1p, Slot 2p, Slot 3p, Slot 1m, Slot 2m and Slot 3m. Slot 1p/Slot 1m and Slot 3p/Slot 3m each contain a single coil 176A, 176B. Slot 2p/Slot 2m contains two coils 176C, 176D. By separating the coils into three separate areas (coils slots, heat buildup in each coil is minimized, and any heat that is built up is more easily removed. FIG. 19 also illustrates the angles between the slots, by way of example. The angle between Slot 1p and Slot 2p is generally made to be the same as the angle between Slot 2p and Slot 3p, and also between Slot 1m and Slot 2m, as well as Slot 2m and Slot 3m. Any angle between 0 and 90 degrees will be effective. However, a desirable performance is achieved with angles between 15 and 45 degrees, yet such a range is not intended to be limited. From a manufacturing point of view, it is easy to insert the coil into Slot 1p/Slot 1m and Slot 3p/Slot 3m when the angle is around 22 degrees.

Each slot (Slot 1p, Slot 1m, Slot 2p, Slot 2m, Slot 3p, Slot 3m) is wide, which results in the coil resistance and electrical inductance of each coil placed into the slot will be low. By way of example, Slot 1p/Slot 1m and Slot 3p/Slot 3m are 0.026 inches wide, and Slot 2p/Slot 2m is 0.048 inches wide. Moreover, the total width of all slots presents what appears to the magnetic circuit to be a very large total gap between teeth of 0.1 inches. Since the rotor magnet diameter in this example is 0.12 inches, the total gap between teeth around the magnet is more than 80% of the rotor magnet diameter itself. Because of this very wide effective gap between teeth, this embodiment has the lowest inductance of all previous embodiments presented.

With continued reference to FIG. 17, the restoring magnets 134, 136 are placed outside of the rotor magnet 122, and are effectively buried within the stator steel as earlier described. The benefit of this embodiment is that since the coils are distributed, the heat can be easily removed from the distributed coils. Moreover, this level of distribution provides for a very low inductance actuator.

By way of example for the actuator shown in FIG. 17, with 10 turns AWG #29 magnet wire placed in the areas designated Coil 1 plus/Coil 1 minus, Coil 2 plus/Coil 2 minus, Coil 3 plus/Coil 3 minus, and Coil 4 plus/Coil 4 minus (a total of 40 turns connected in series), the Torque Constant (KT) is around 38,000 Dyne Centimeters per amp, Coil Resistance (R) is around 1.0 ohms, and Coil Inductance (L) is around 94 microhenries. Note that this delivers the same Torque Constant (KT) as the toothless actuator, but with nearly one third the coil resistance and with lower Coil Inductance (L). Each coil area surrounds the coil on three sides, providing a desirable and effective thermal path to remove heat from the coils. These specifications are far superior to the toothless actuator.

Figure 20:
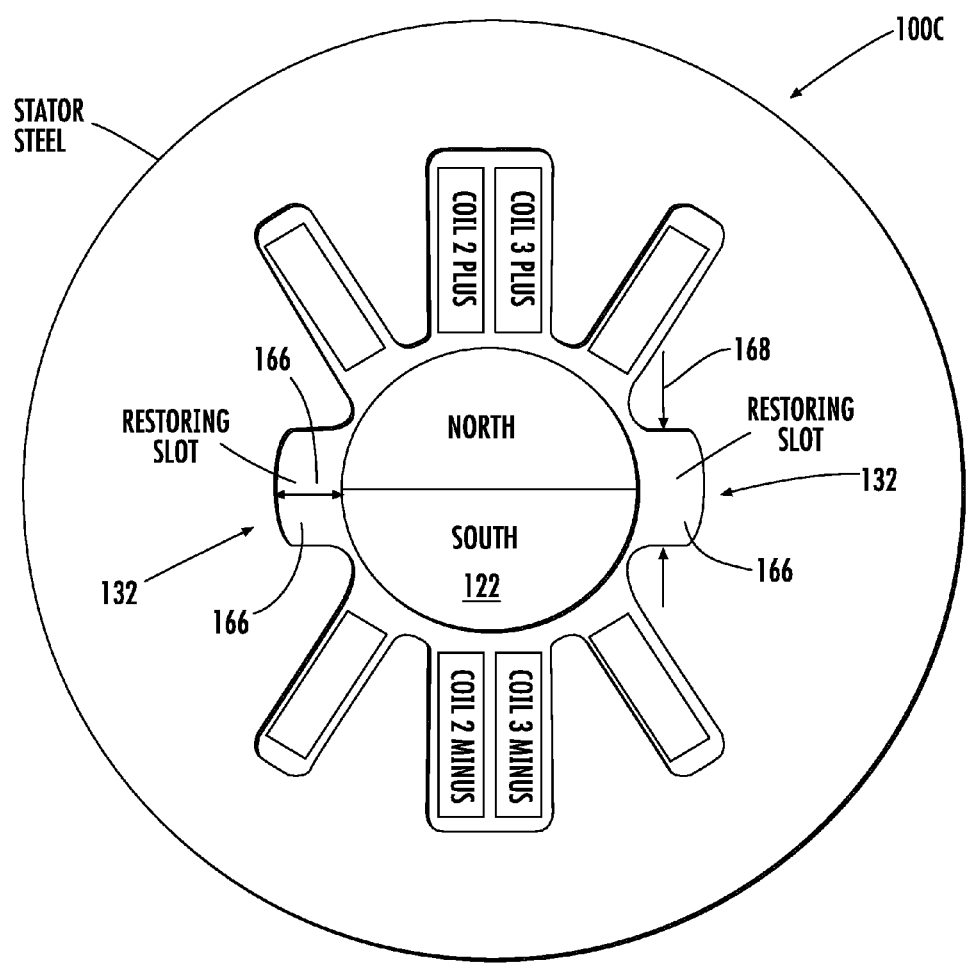
FIG. 20 illustrates another embodiment of the present invention, wherein the wire coil is located in six slots but without use of restoring magnets.
Figure 21:
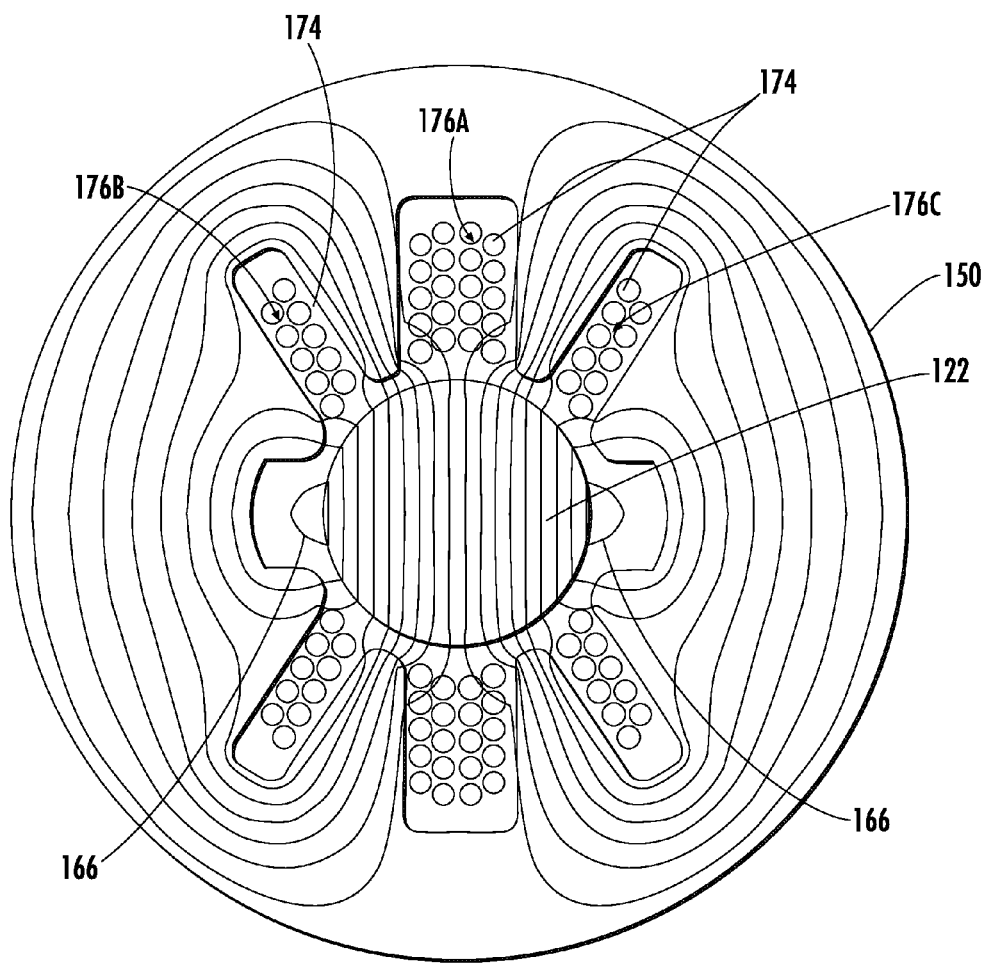
FIG. 21 illustrates the magnetic flux lines in the embodiment shown in FIG. 20.

FIG. 20 illustrates another embodiment of the present invention. This embodiment is similar to that shown in FIG. 17, insomuch that there are three coil areas on each side of the rotor magnet. However, in this embodiment, there are no restoring magnets. Instead, the rotor position restoring means 132 is facilitated by the inside shape of stator steel, which is not circular and instead, has the restoring slot areas 166. When the slots for the coils (Slot 1p, Slot 1m, Slot 2p, Slot 2m, Slot 3p, Slot 3m, Slot 4p, Slot 4m) are evenly distributed around the inside diameter of the stator, while leaving room for the restoring slot areas 166 (shown on the left and right in FIG. 20 and FIG. 21), the rotor position will be restored to the center as long as the width 168 of the restoring slots is wider than the width of Slot 2p/Slot 2m (which are located at 90 degree angles with respect to the restoring slot areas) and the depth of the restoring slot areas is greater than or equal to around three times the distance of the gap between the rotor magnet and the stator teeth. In the case of this example actuator 100, the rotor magnet diameter is 0.120 inches and stator inside diameter is 0.136 inches, providing a gap between the rotor magnet and stator steel of 0.008 inches, the width of the restoring slot area 166 is 0.050 inches, and the depth 170 of the restoring slot area 166 is 0.024 inches. As above described, the restoring slot area 166 may be modified to look more oval than slot-like, similar to the embodiment shown in FIG. 13, and still remain within the scope of this invention. FIG. 21 illustrates the flux lines 150 for the embodiment of FIG. 20.

Figure 22:
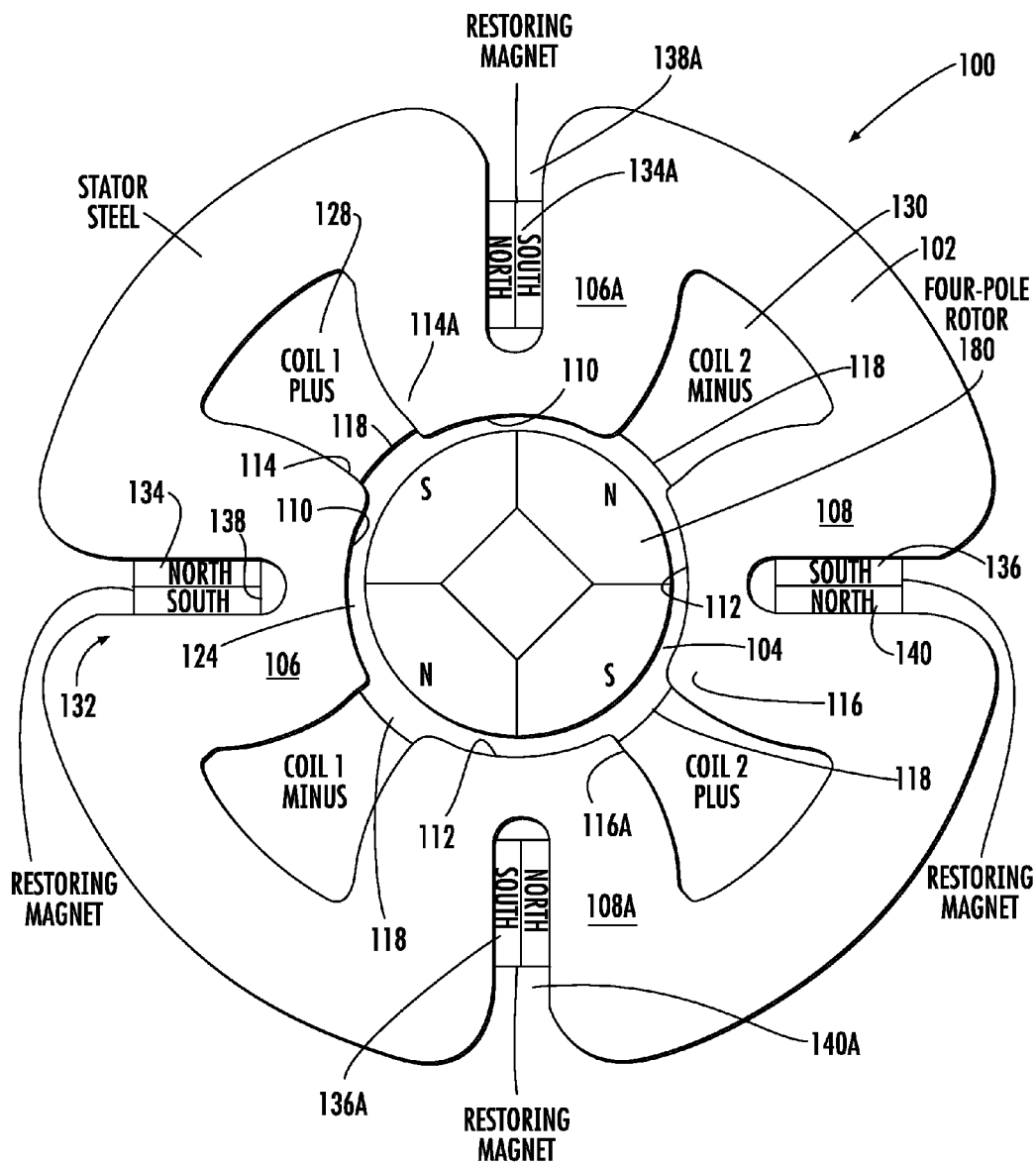
FIG. 22 illustrates another embodiment of the present invention, wherein a four-pole rotor and restoring magnets are used.

FIG. 22 illustrates another embodiment of the present invention. In this embodiment, the actuator 100 comprises a four-pole rotor magnet 180 is used. In the past, typical four-pole actuators have been manufactured for application in the field of optical scanning, but the cogging torque was barely tolerable, and inductance also was not desirable. For that reason, the four pole actuators never gained popularity. However, using the stator arrangement shown in FIG. 22, cogging torque is completely eliminated by the Restoring Magnets.

Figure 23:
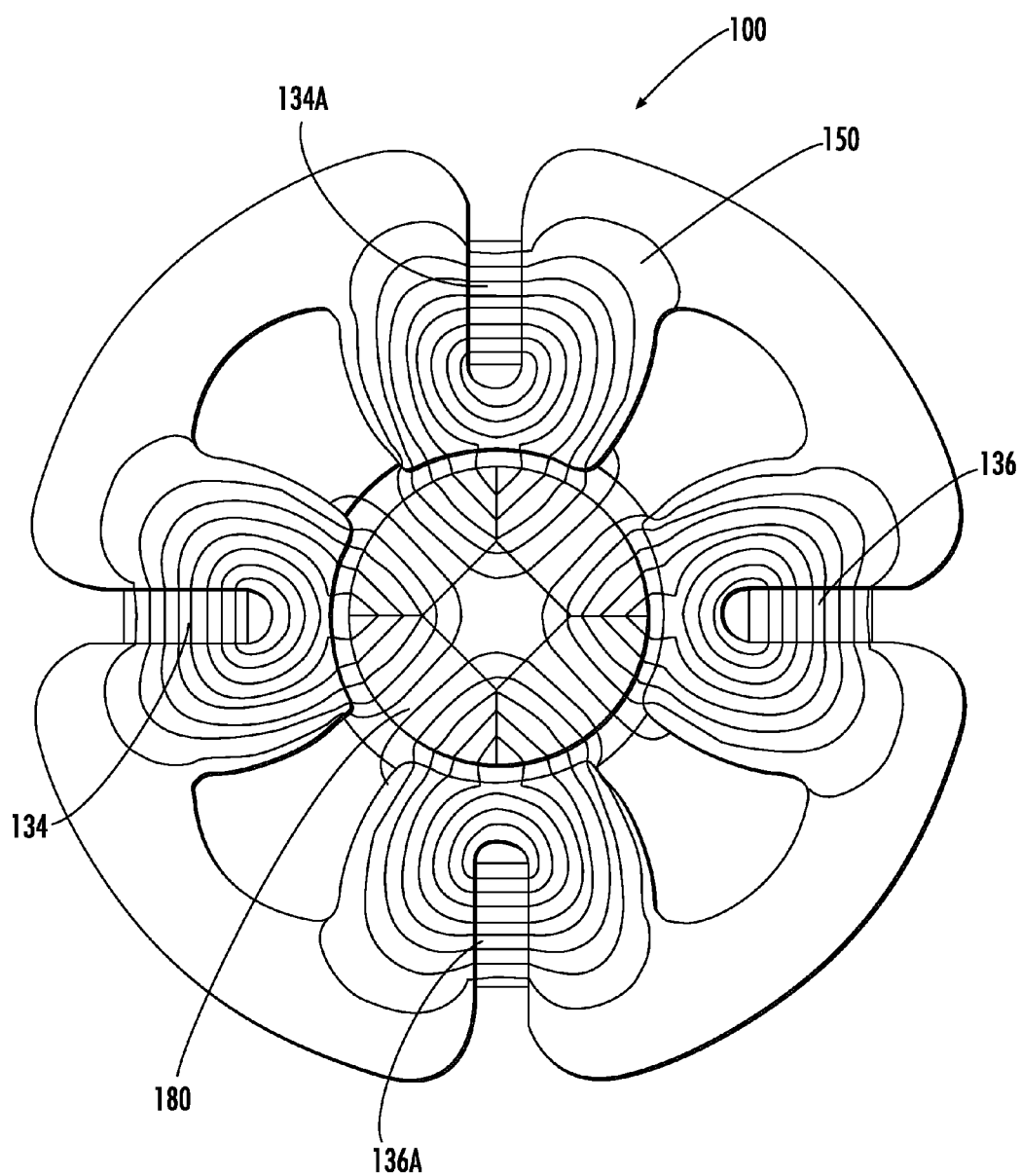
FIG. 23 illustrates the magnetic flux lines in another the embodiment shown in FIG. 22.

With continued referee to FIG. 22, the actuator 100 may be described as including the stator 102 having the aperture 104 extending axially therein and four teeth 106, 108, 106A, 108A having contoured ends 110, 112 forming a portion of the aperture. The distal ends 114, 116, 114A, 116A of the four teeth are in a spaced relationship so as to form the gap 118, as above described. The rotor 120 uses a four-pole magnet means, herein described as the four-pole magnet 180 extending into the aperture 104, wherein the separation 124 is formed between the magnet 180 and the contoured ends of the at least four teeth 106, 108, 106A, 108A. The electrical coils 128, 130 extend around at least portions of the teeth. The rotor restoring means 132, herein the restoring magnets 134, 136, 134A, 136A are carried within the slots 138, 140, 138A, 140A of the teeth. The two coils 128, 130 substantially fill space between the four teeth for transmitting heat generated in the coils to the stator through thermal contact therewith. The gap 118 between the stator teeth is also opened up and allowed to be wider, providing an actuator with very low inductance. FIG. 23 illustrates the flux lines 150 for the embodiment of FIG. 22.

Figure 24:
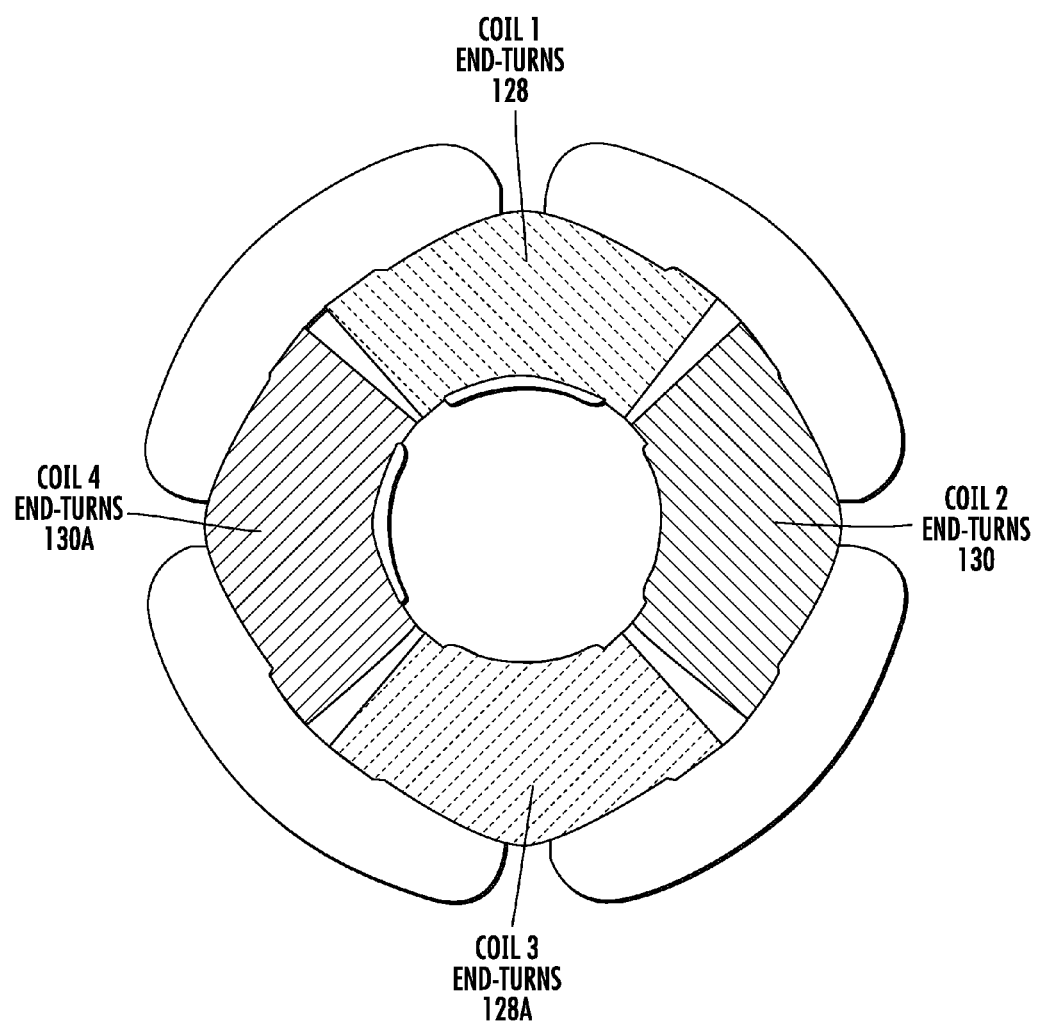
FIG. 24 illustrates how the four-pole embodiment found in FIG. 22 may be wound with four separate coils, wherein one coil is wound around each tooth.
Figure 25:
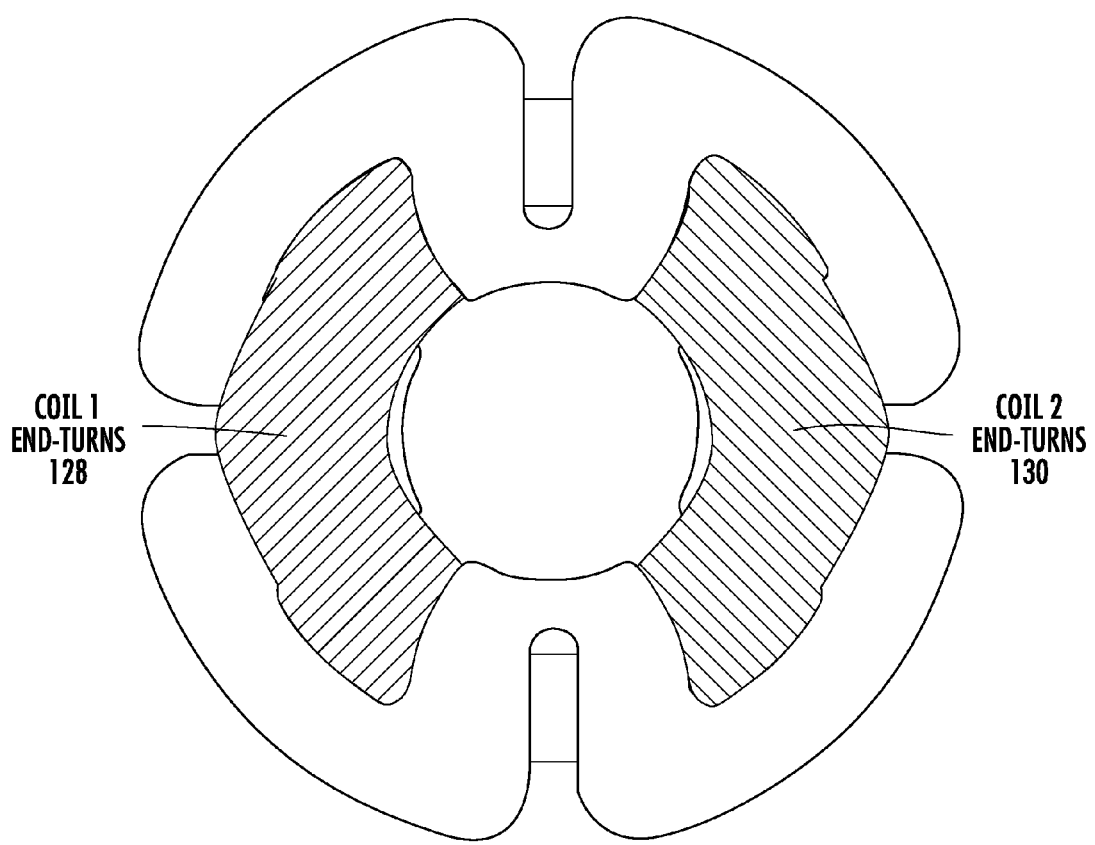
FIG. 25 illustrates how the four-pole embodiment found in FIG. 22 may be wound with two separate coils wound around alternating teeth.
Figure 26:
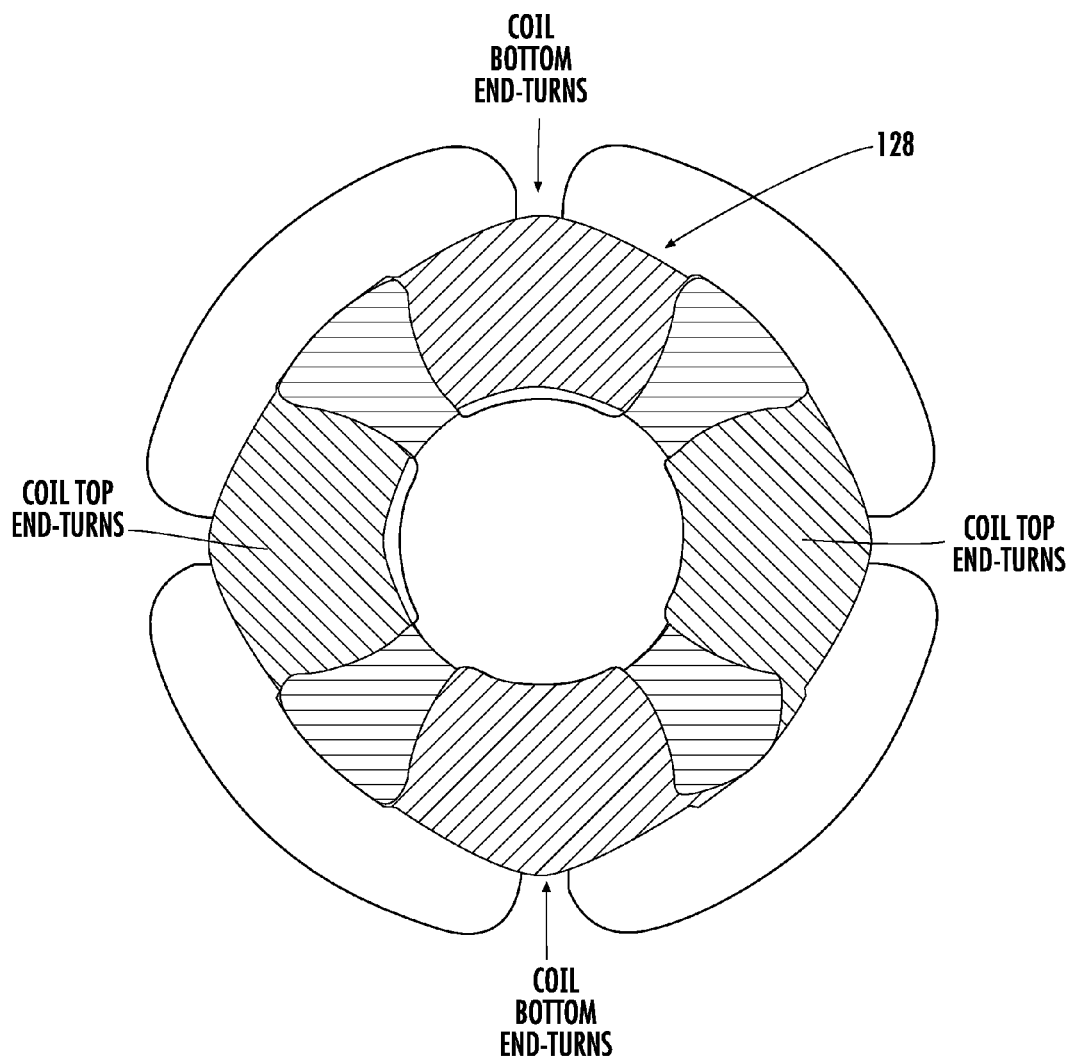
FIG. 26 illustrates how the four-pole embodiment found in FIG. 22 may be wound with a single coil in a serpentine fashion around alternating teeth.

For the four-pole actuator 100, herein described with reference to FIG. 22, the coils 128, 130 may be wound in several ways. For example, four individual coils may be wound around the four teeth of the embodiment of FIG. 22 as shown in FIG. 24. Alternatively, two coils may be wound including a coil around alternating teeth as shown in FIG. 25. As yet another alternative, a single coil may be wound around all teeth, in a serpentine fashion, as illustrated with reference to FIG. 26. The benefit of winding a single coil around each tooth is that the end-turns do not take up as much space and thus, the motor's axial length can be reduced. The benefit of winding two coils on alternating teeth is that the number of coils is half compared to placing a single coil on each tooth. The benefit of the serpentine winding is that only a single coil is needed for all teeth.

While not intended to be limiting, the stator steel can be any magnetically conductive material, but would preferably be motor-grade silicon steel. Moreover, the shape of the stator can be manufactured using any known manufacturing technique, but it has been found to be easiest to manufacture the stator by punching, laser cutting, or photo etching the shape into thin laminations, such as 0.014 inch thick M-19 material, and then stacking the laminations to achieve the desired axial motor length.

Figure 27:
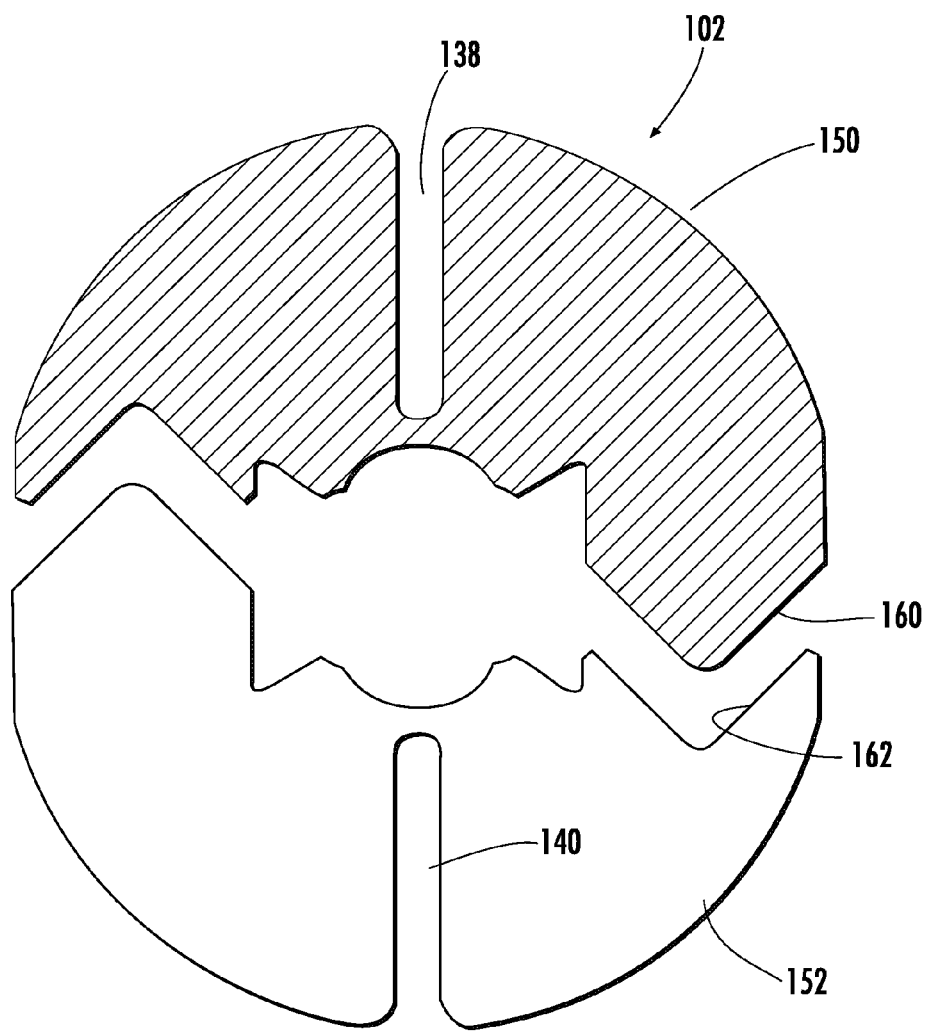
FIG. 27 illustrates how a stator for two-pole embodiments may be separated into segments, for ease of actuator manufacturing and assembly, wherein the segments may include a point-and-socket arrangement which helps alignment.
Figure 28:
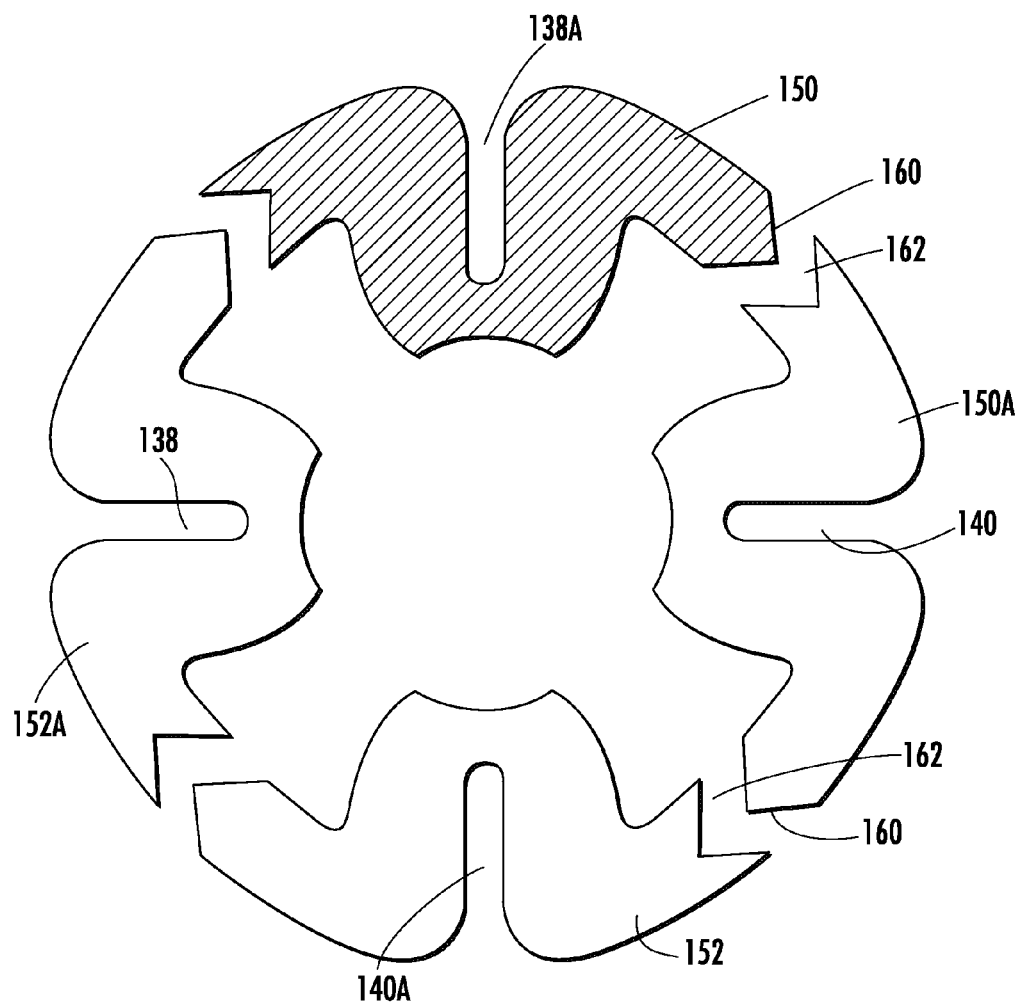
FIG. 28 illustrates how a stator for four-pole embodiments may be separated into segments, for ease of actuator manufacturing and assembly, wherein the segments may include a point-and-socket arrangement which helps alignment.
Figure 29:
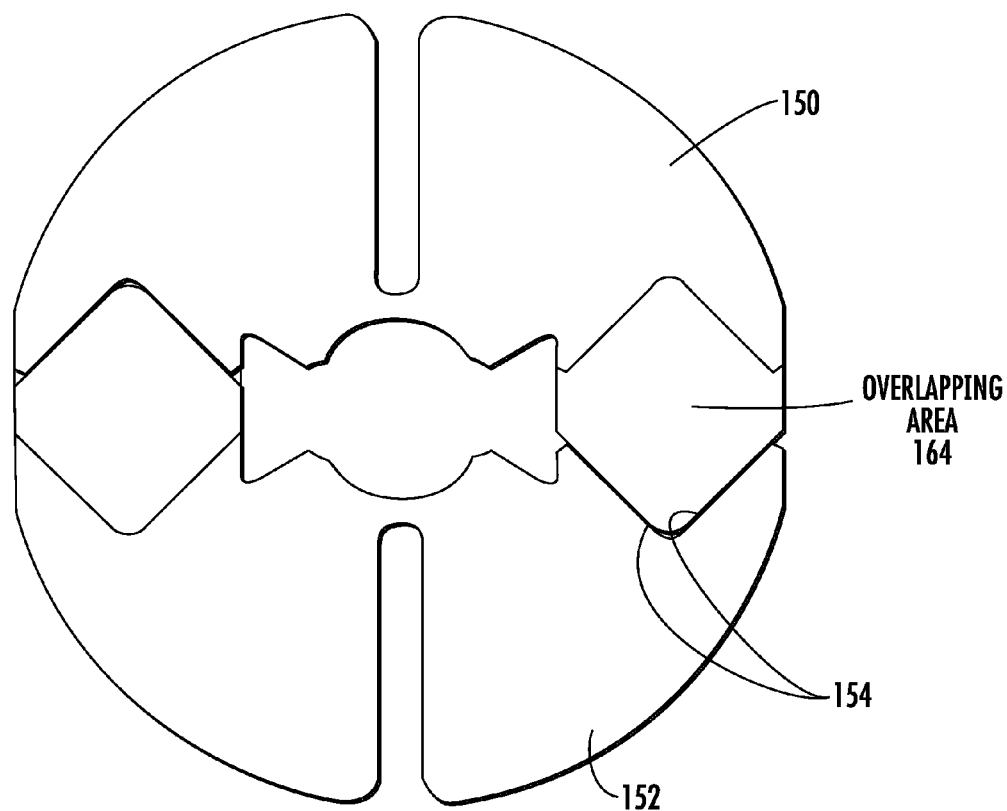
FIG. 29 illustrates how the segments may also be arranged in alternating layers to form an overlapping area, the overlapping area reducing overall stator reluctance, once assembled.

Also note that the laminations 154 above described with reference to FIG. 9A forming the stator 102 may be manufactured as a single solid layer or alternatively as separate segments as shown in FIG. 27 and FIG. 28, which, when assembled together form the final desired shape. The segments or stator sections 150, 152 may also include overlapping portions on alternated lamination layers to reduce the overall reluctance of the magnetic path as shown in FIG. 29, and as above described.

Note that the rotor magnet 122 and the restoring magnets 134, 136, 134A, 136A can be made from any magnet material, and that the restoring magnets may be made from a different material than the rotor magnet. However, highest performance is currently derived by using Neodymium Iron Boron N48H or better for the rotor magnet.

Note that in all embodiments that provide two or more separate coils, it is possible to wind and/or provide current to only a single coil and remain within the scope of this invention. And, while actuators that use more than one coil usually connect the coils in series, it is possible to connect the coils in parallel, or series-parallel and still remain within the scope of this invention.

As above described, in all embodiments that use restoring magnets, it is possible to use only a single restoring magnet to overcome the cogging torque and still remain within the scope of this invention. However, using only a single Restoring Magnet will also create a radial force on the rotor magnet, effectively attracting the rotor magnet toward the restoring magnet. This may be beneficial in applications that use a radial preload for the support bearings.

The amount of rotor position restoration depends on the width and length (in the magnetized direction) of the restoring magnets. If either the width or the length is increased, a greater degree of restoration (torque toward the center of the range of rotation angles) is provided.

Figure 30:
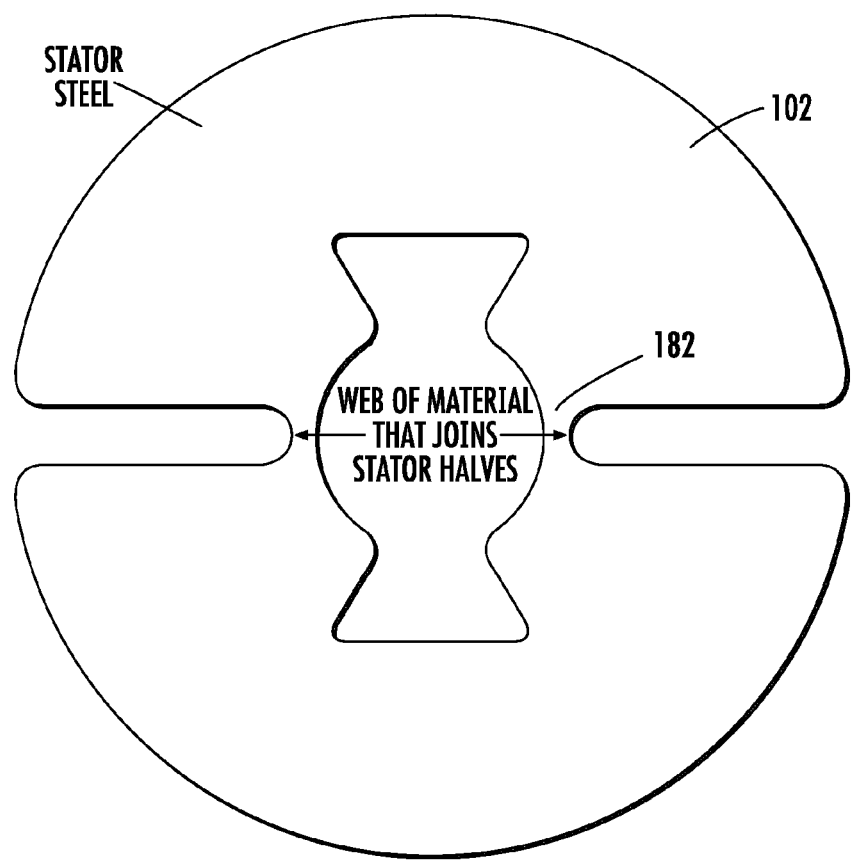
FIG. 30 illustrates use of a small web of material at an end of a slot within which restoring magnets are placed, wherein the web of material is made relatively thin, typically around the thickness of a lamination (for example 0.014 inches), and is provided to help the stator retain a precise shape, and wherein the thinness of the web of material makes it effectively invisible to magnetism because it becomes magnetically saturated.
Figure 31:
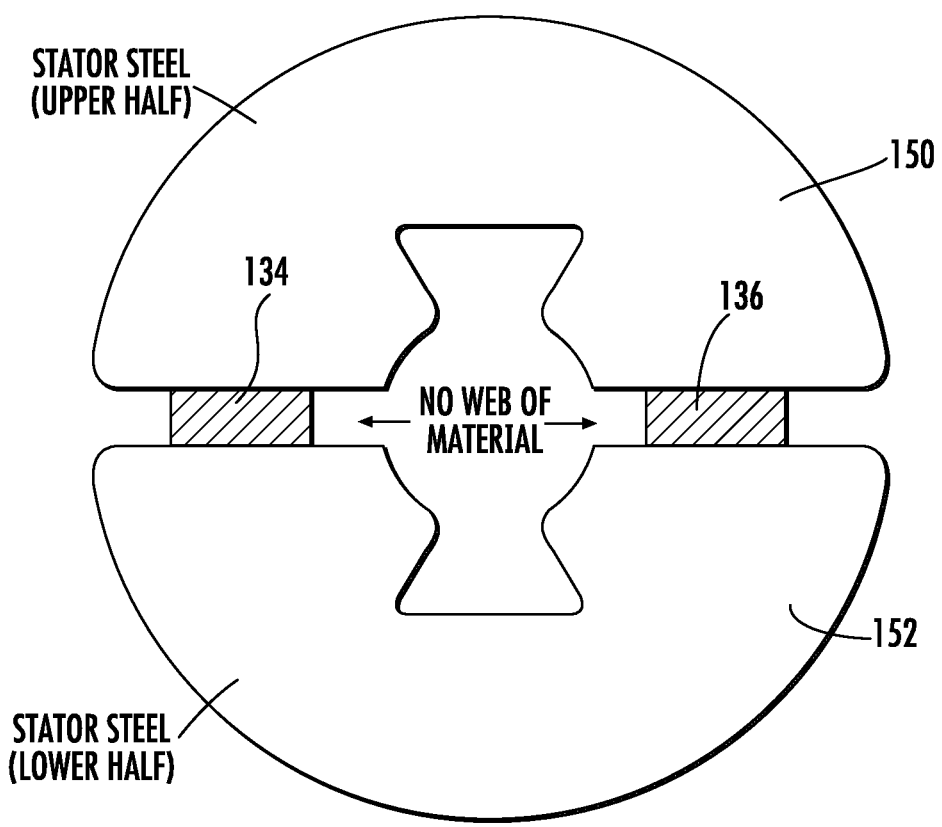
FIG. 31 illustrates how the web of material may be removed, essentially allowing the stator to exist in segments, with each segment effectively attached to the restoring magnet, wherein rotor position restoration will occur with or without the web of material.

Further modifications may be employed in keeping with the teachings of the present invention. By way of example, reference in now made to FIG. 30 illustrating a small web 182 of material at a magnet end of the slots 138, 140 where the restoring magnets 134, 136 may be placed, as addressed earlier with reference to FIG. 11. The web 182 of material may be made to be very thin, typically around the thickness of the lamination 154 (for example 0.014 inches). This is provided to help the stator 102 retain a precise shape, wherein the thickness dimension (i.e. its thinness) of the web 182 of material makes it effectively invisible to magnetism because it becomes magnetically saturated. Further, and as illustrated with reference to FIG. 31, the web 182 of material can be removed, allowing the stator 102 to exist in segments 150, 152, with each segment effectively attached to the restoring magnet 134, 136. Restoration will occur with or without the web 182 of material.

As will come to the mind of those skilled in the art, now having the benefit of the teachings of the present invention, it is also possible to use multiple magnets as long as they are magnetized and aligned to provide the flux lines in the desired orientation, as will be herein described in greater detail. Moreover, although an exemplary embodiment uses a two-pole magnet, it is also possible to use a rotor magnet with a greater number of poles, as will be illustrated later in this disclosure.

Although a detailed description and drawings of the invention has been provided above, it is to be understood that the scope of the invention is not to be limited thereby. Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A limited rotation rotary actuator comprising:
a stator having an aperture extending axially therein and at least two teeth having contoured ends forming at least a portion of the aperture, wherein distal ends of the at least two teeth form a gap therebetween;
a rotor having a two-pole diametral magnet bidirectionally operable within the aperture, wherein a separation is formed between the magnet and the contoured ends of the at least two teeth;
at least one first slot extending longitudinally within at least one tooth of the at least two teeth;
at least one second slot extending from the aperture to within the stator, the at least one second slot generally aligned orthogonally to the at least one first slot, wherein the at least one second slot includes a finger of stator material extending therein toward the aperture to form a bifurcated second slot;

at least one electrical coil extending within the at least one second slot, wherein the at least one electrical coil is divided by the finger and, wherein the electrical coil is excitable for providing bidirectional torque to the rotor; and rotor restoring means within at least a single first slot of the at least one first slot, wherein the rotor restoring means is positioned for restoring the rotor to a central rotation angle when current is withheld to the at least one electrical coil.

2. The actuator according to claim 1, wherein the at least one second slot comprises an opposing second slot pair, and wherein the at least one electrical coil comprises two electrical coils extending within the slot pair.

3. The actuator according to claim 2, wherein one coil of the two electrical coils extends within the slot pair along one side of the finger and a second coil of the two electrical coils extends along an opposing side of the finger, the finger thus maintaining a separation between the two coils.

4. The actuator according to claim 1, wherein a length dimension of the gap is at least forty percent of a diameter of the magnet.

5. The actuator according to claim 1, wherein the rotor restoring means comprises at least one restoring magnet.

6. The actuator according to claim 1, wherein the restoring means comprises a non-uniform separation formed between the magnet and the contoured ends of the at least two teeth, the non-uniform separation resulting in a greater separation proximate a central portion of the teeth arcuate ends than the separation proximate the distal ends thereof, and wherein the non-uniform separation provides a restoration torque resulting in a spring-like return-to-center action of the rotor.

7. The actuator according to claim 6, wherein the non-uniform separation forms a restoring slot on opposing sides of the rotor magnet.

8. The actuator according to claim 7, wherein the restoring slot forms an oval shape.

9. The actuator according to claim 1, wherein the at least one first slot extending longitudinally within at least one tooth of the at least two teeth comprises a restoring slot extending from the aperture outwardly into the stator.

10. The actuator according to claim 9, wherein the restoring slot is formed within the contoured ends of the at least two teeth, and wherein a first restoring slot is radially opposing a second restoring slot.

11. The actuator according to claim 9, wherein the restoring slot forms an oval shape.

12. A limited rotation rotary actuator comprising:
a stator having an aperture extending axially therein and at least two teeth having contoured ends forming at least a portion of the aperture, wherein distal ends of the at least two teeth form a gap therebetween;
a rotor having a two-pole diametral magnet bidirectionally operable within the aperture, wherein a separation is formed between the magnet and the contoured ends of the at least two teeth;
at least one first slot extending longitudinally within at least one tooth of the at least two teeth;
at least one second slot extending from the aperture to within the stator, the at least one second slot generally aligned orthogonally to the at least one first slot, at least one electrical coil extending within the at least one second slot, wherein the at least one second slot comprises multiple fingers of stator material extending therein toward the aperture to form a partitioned second slot having a central coil area and adjacent coils areas therein, and wherein the electrical coil is excitable for providing bidirectional torque to the rotor; and
rotor restoring means within at least a single first slot of the at least one first slot, wherein the rotor restoring means is positioned for restoring the rotor to a central rotation angle when current is withheld to the at least one electrical coil.

13. The actuator according to claim 12, wherein the coil areas extend generally radially outward from an axis of the rotor magnet, and wherein the adjacent coils areas are offset from the central coil area by an angle within a range of 15 degrees to 45 degrees.

14. The actuator according to claim 12, wherein the at least one electrical coil extends within the central coil area.

15. The actuator according to claim 12, wherein the at least one first slot extending longitudinally within at least one tooth of the at least two teeth comprises a restoring slot extending from the aperture outwards into the stator, the restoring slot having a width dimension greater than a dimension of the gap.

16. The actuator according to claim 15, wherein the restoring slot is formed within the contoured ends of the at least two teeth, and wherein a first restoring slot is radially opposing a second restoring slot.

17. The actuator according to claim 15, wherein the at least one electrical coil extending within the at least one second slot comprises multiple electrical coils extending within each of the coil areas.

18. The actuator according to claim 17, wherein the multiple coils are connected in series.

19. The actuator according to claim 12, wherein the restoring means comprises a non-uniform separation formed between the magnet and the contoured ends of the at least two teeth, the non-uniform separation resulting in a greater separation proximate a central portion of the teeth arcuate ends than the separation proximate the distal ends thereof, and wherein the non-uniform separation provides a restoration torque resulting in a spring-like return-to-center action of the rotor.

20. The actuator according to claim 19, wherein the non-uniform separation forms a restoring slot on opposing sides of the rotor magnet.

21. The actuator according to claim 20, wherein the restoring slot forms an oval shape.

* * * * *